US012665280B2

(12) United States Patent
Motoi et al.

(10) Patent No.: US 12,665,280 B2
(45) Date of Patent: Jun. 23, 2026

(54) RADIO APPARATUS, RADIO SYSTEM, AND HEAT DISSIPATION STRUCTURE

(71) Applicant: NEC Corporation, Tokyo (JP)

(72) Inventors: Keiichi Motoi, Tokyo (JP); Toshihide Kuwabara, Tokyo (JP); Tomoya Kaneko, Tokyo (JP)

(73) Assignee: NEC CORPORATION, Tokyo (JP)

( * ) Notice: Subject to any disclaimer, the term of this patent is extended or adjusted under 35 U.S.C. 154(b) by 142 days.

(21) Appl. No.: 18/684,931

(22) PCT Filed: Jan. 19, 2022

(86) PCT No.: PCT/JP2022/001852

§ 371 (c)(1),
(2) Date: Feb. 20, 2024

(87) PCT Pub. No.: WO2023/032247

PCT Pub. Date: Mar. 9, 2023

(65) Prior Publication Data

US 2024/0356193 A1 Oct. 24, 2024

(30) Foreign Application Priority Data

Sep. 2, 2021 (JP) ................................ 2021-143058

(51) Int. Cl.
*H01Q 1/02* (2006.01)
*H01Q 13/08* (2006.01)
(Continued)

(52) U.S. Cl.
CPC ............. *H01Q 1/02* (2013.01); *H01Q 13/085* (2013.01); *H01Q 15/14* (2013.01); *H01Q 21/00* (2013.01)

(58) Field of Classification Search
CPC ........ H01Q 1/02; H01Q 13/085; H01Q 15/14; H01Q 21/00
See application file for complete search history.

(56) References Cited

U.S. PATENT DOCUMENTS

| | | | | |
|---|---|---|---|---|
| 9,356,359 | B2 * | 5/2016 | Ma | H04W 84/042 |
| 11,626,654 | B2 * | 4/2023 | Wang | H01Q 1/02 343/904 |

(Continued)

FOREIGN PATENT DOCUMENTS

| | | | | |
|---|---|---|---|---|
| EP | 3196976 | B1 | 7/2017 | |
| JP | 2004-515075 | A | 5/2004 | |

(Continued)

OTHER PUBLICATIONS

International Search Report for PCT Application No. PCT/JP2022/001852, mailed on Apr. 5, 2022.

(Continued)

*Primary Examiner* — Hai V Tran
(74) *Attorney, Agent, or Firm* — Sughrue Mion, PLLC

(57) ABSTRACT

A radio apparatus that has a high heat dissipation performance and can be manufactured at a low cost is provided. A radio apparatus includes a heat dissipation part that dissipates heat generated by a heat generation source to the outside. The heat dissipation part is composed of a solid material, and includes a heat dissipation plate and a plurality of heat dissipation fins provided in the heat dissipation plate, the plurality of heat dissipation fins being disposed on a side of the heat dissipation plate where a radiating element or a reflective element is disposed. The heat dissipation fins form a periodic structure along at least one direction on the heat dissipation plate. Tips of the plurality of heat dissipation fins form a virtual reflective surface that reflects incident waves to the plurality of heat dissipation fins.

9 Claims, 39 Drawing Sheets

(51) Int. Cl.
*H01Q 15/14* (2006.01)
*H01Q 21/00* (2006.01)

(56) References Cited

U.S. PATENT DOCUMENTS

| | | | | |
|---|---|---|---|---|
| 2004/0164915 | A1* | 8/2004 | Quan | H01Q 3/46 343/753 |
| 2013/0176683 | A1* | 7/2013 | Chao | H05K 1/0236 174/252 |
| 2015/0303562 | A1 | 10/2015 | Chen | |
| 2017/0104277 | A1* | 4/2017 | Viscarra | H01Q 1/526 |
| 2017/0214150 | A1* | 7/2017 | Zhao | H01Q 21/0025 |
| 2018/0358710 | A1* | 12/2018 | Toyao | H01Q 15/148 |
| 2020/0021005 | A1* | 1/2020 | Kosaka | H01Q 1/42 |
| 2022/0285820 | A1* | 9/2022 | Kim | H01Q 1/02 |

FOREIGN PATENT DOCUMENTS

| | | | |
|---|---|---|---|
| JP | 2011-040742 | A | 2/2011 |
| JP | 2013-152256 | A | 8/2013 |
| JP | 6342136 | B2 | 4/2015 |
| JP | 6520568 | B2 | 3/2017 |
| JP | 2019-129532 | A | 8/2019 |
| JP | 2021-022915 | A | 2/2021 |
| WO | 2010/125784 | A1 | 11/2010 |
| WO | 2017/086377 | A1 | 5/2017 |

OTHER PUBLICATIONS

JP Office Action for JP Application No. 2023-545012, mailed on Oct. 1, 2024 with English Translation.

* cited by examiner

RADIO APPARATUS, RADIO SYSTEM, AND HEAT DISSIPATION STRUCTURE

This application is a National Stage Entry of PCT/JP2022/001852 filed on Jan. 19, 2022, which claims priority from JP Patent Application 2021-143058 filed on Sep. 2, 2021, the contents of all of which are incorporated herein by reference, in their entirety.

TECHNICAL FIELD

The present disclosure relates to a radio apparatus, a radio system, and a heat dissipation structure.

BACKGROUND ART

In recent years, mobile communication systems, most notably a fifth-generation mobile communication system (5G), have become more sophisticated, e.g., the capacity and the speed of radio communication have been increased, and there is thus a demand that functions of a mobile base station such as beamforming be improved.

Due to the above demand that the functions be improved, there is also a demand that a radio apparatus have high heat dissipation performance. For example, Patent Literature 1 discloses a radio apparatus including a heat dissipation part using a Frequency Selective Surface (FSS).

CITATION LIST

Patent Literature

Patent Literature 1: International Patent Publication No. WO 2017/086377

SUMMARY OF INVENTION

Technical Problem

As disclosed in Patent Literature 1, when minute metal patterns functioning as a frequency selective surface are arranged on the side surface of a heat dissipation fin composed of a printed circuit board or the like, there is a problem that the manufacturing cost of the radio apparatus increases due to the cost of manufacturing the printed circuit boards and mounting the printed circuit boards on the apparatus.

An object of the present disclosure is to provide a radio apparatus, a radio system, and a heat dissipation structure for solving the above-described problem.

Solution to Problem

A radio apparatus according to one example embodiment of the present disclosure includes a radiating element or a reflective element of a radio signal, and a heat dissipation part configured to dissipate heat generated by a heat generation source including the radiating element or the reflective element to the outside, in which

- the heat dissipation part is composed of a solid material having a thermal conductivity and an electrical conductivity, and includes a heat dissipation plate and a plurality of heat dissipation fins provided in the heat dissipation plate, the plurality of heat dissipation fins being disposed on a side of the heat dissipation plate where the radiating element or the reflective element is disposed,
- the heat dissipation fins form a periodic structure along at least one direction on the heat dissipation plate, and
- tips of the plurality of heat dissipation fins form a virtual reflective surface that reflects incident waves to the plurality of heat dissipation fins.

A radio system according to one example embodiment of the present disclosure includes:

- the above-described radio apparatus; and
- a signal processing unit configured to process a radio signal transmitted and received by an antenna element, the antenna element being a radiating element of the radio apparatus.

A heat dissipation structure according to one example embodiment of the present disclosure is a heat dissipation structure configured to dissipate heat generated by a heat generation source including a radiating element or a reflective element of a radio signal to the outside, in which

- the heat dissipation structure is composed of a solid material having a thermal conductivity and an electrical conductivity, and includes a heat dissipation plate and a plurality of heat dissipation fins provided in the heat dissipation plate, the plurality of heat dissipation fins being disposed on a side of the heat dissipation plate where the radiating element or the reflective element are disposed,
- the heat dissipation fins form a periodic structure along at least one direction on the heat dissipation plate, and
- tips of the plurality of heat dissipation fins form a virtual reflective surface that reflects incident waves to the plurality of heat dissipation fins.

Advantageous Effects of Invention

According to the present disclosure, it is possible to provide a radio apparatus, a radio system, and a heat dissipation structure that each have high heat dissipation performance and can be manufactured at a low cost.

EXAMPLE EMBODIMENT

Figure 1:
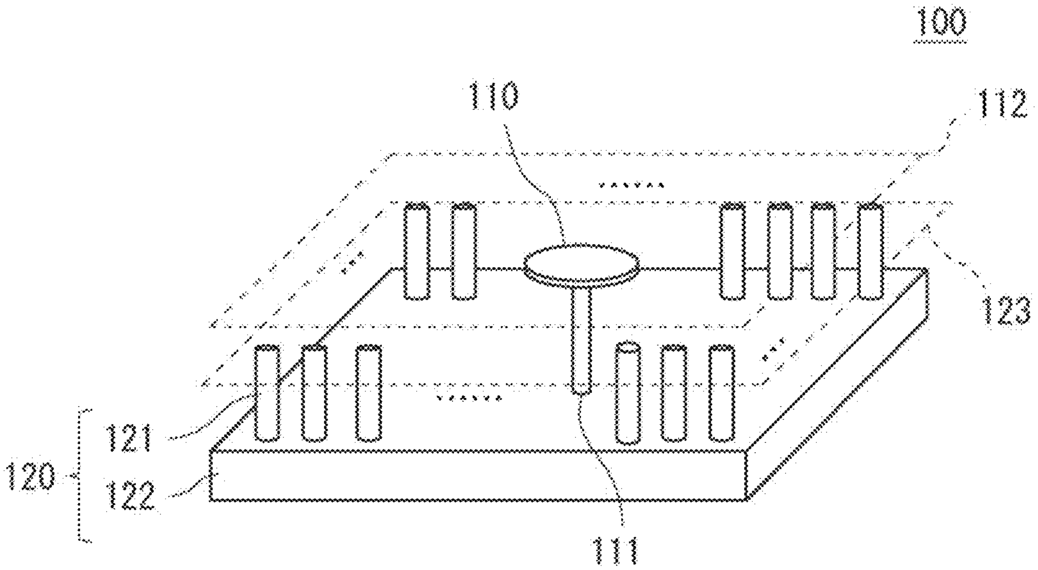
FIG. 1 is a perspective view of an antenna apparatus according to a first example embodiment of the present disclosure.

Example embodiments will be described hereinafter with reference to the drawings. Note that since the drawings are drawn in a simplified manner, the technical scope of the example embodiments should not be narrowly interpreted based on the descriptions of the drawings. Further, the same elements are denoted by the same reference symbols, and redundant descriptions will be omitted.

In the following example embodiments, when necessary, the present disclosure is explained by using separate sections or separate example embodiments. However, those example embodiments are not unrelated with each other, unless otherwise specified. That is, they are related in such a manner that one example embodiment is a modified example, an application example, a detailed explanation, or a supplementary explanation of a part or the whole of another example embodiment.

Further, in the following example embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may also be used.

Further, in the following example embodiments, their components (including operation steps and the like) are not necessarily essential except for cases where the component is explicitly specified or the component is obviously essential based on its principle.

Similarly, in the following example embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

History of Study Until an Antenna Apparatus According to the Example Embodiments is Conceived Due to the rapid spread of radio communication, there is a shortage in frequency bands used for radio communication. Consequently, especially in the fifth-generation (5G) mobile communication system, the increase in the number of mobile base stations and the securing of places where mobile base stations that carry out mobile communications are installed have become problems in order to effectively use higher frequency bands. Therefore, there is a demand that the size and the weight of a mobile base station are further reduced in view of the installation, the appearance, and the like.

In order to reduce the size and the weight of the mobile base station, it is necessary to reduce the power consumption of each unit composing the radio apparatus, i.e., the heat generation source, and to increase the amount of heat dissipation. Regarding the reduction of the heat generation source, the main way to reduce it is by reducing the power consumption of a power amplifier, which accounts for a large proportion of the power consumption of the radio apparatus. However, making a significant reduction in the power consumption of the power amplifier while also taking into account the broadband characteristics, output power, linearity, and the like is difficult to achieve, and much research and development is now being conducted to try to achieve this.

Meanwhile, regarding heat dissipation, a heat sink provided on the rear surface of the radio apparatus has been used. In order to improve the heat dissipation performance, when a heat dissipation structure is also provided on the same side of the radio apparatus as the antenna surface, i.e., the front surface, as disclosed in Japanese Patent No. 6520568, it is necessary to provide an electromagnetic protection wall such as a metal wall around the antenna element to avoid electromagnetic coupling between the antenna element and the surrounding heat dissipation structure. Therefore, there is a problem that the number of possible positions where the heat dissipation fins of the heat dissipation part are arranged and the degree of freedom of the antenna design are reduced, and that additional materials and manufacturing processes to form the wall are required.

Further, as disclosed in Japanese Patent No. 6342136, when a refrigerant supply part is provided, there is a problem that an external apparatus such as a circulating apparatus is required and thus the apparatus becomes complicated and the size thereof becomes large. Further, there is a problem that when only members such as an antenna and a dielectric are used, the heat dissipation area and heat transfer coefficient are limited and thus a large heat dissipation effect cannot be obtained. To achieve a larger effect, the antenna structure is constrained in order to protrude the antenna. In addition, there is a problem that the structure tends to be unstable.

Further, as disclosed in above-described Patent Literature 1, when minute metal patterns functioning as a frequency selective surface are arranged on the side surface of a heat dissipation fin composed of a printed circuit board or the like, there is a problem that the manufacturing cost of the radio apparatus increases due to the cost of manufacturing the printed circuit boards and mounting the printed circuit boards on the apparatus. Further, there is a problem that when each heat dissipation fin composed of a printed circuit board is individually mounted, it is difficult to closely arrange the heat dissipation fins and thus the heat dissipation performance deteriorates.

Therefore, a radio apparatus according to the following example embodiments has been found which can solve at least one of the problems described above.

First Example Embodiment

Figure 2:
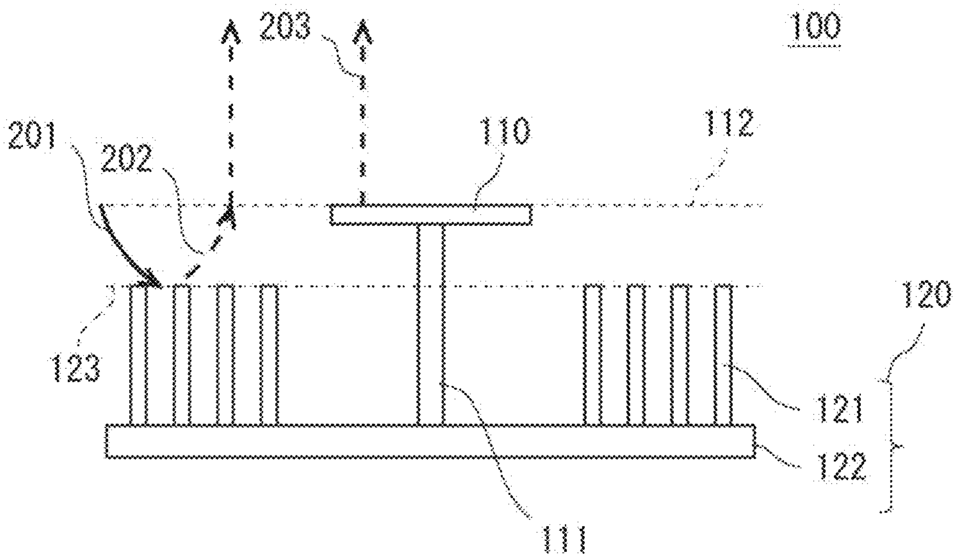
FIG. 2 is a side view of the antenna apparatus according to the first example embodiment of the present disclosure.

An antenna apparatus, which is an example of a radio apparatus according to this example embodiment, will be described with reference to FIGS. 1 and 2. FIG. 1 is a perspective view of a configuration of an antenna apparatus 100 according to this example embodiment, and FIG. 2 is a side view of the same.

The antenna apparatus 100 according to this example embodiment includes an antenna element 110, an antenna feeder 111 connected to the antenna element 110, and a heat dissipation part 120 composed of a member having a thermal conductivity and an electrical conductivity, the heat dissipation part 120 dissipating heat emitted from the antenna apparatus 100 (e.g., the heat generation source including the antenna element 110) to an external environment and including a plurality of heat dissipation fins 121 and a heat dissipation plate 122.

Note that, as the member having a thermal conductivity and an electrical conductivity, metal, a metal-plated dielectric material, a dielectric material containing metal, a composite material of metal and an organic material having a high thermal conductivity and a high electrical conductivity such as a carbon nanotube, and the like are preferably used. However, the present disclosure is not limited thereto and a material having a desired thermal conductivity and an electrical conductivity may be selected as appropriate.

The antenna element 110 is disposed in the heat dissipation plate 122 on the side thereof where the plurality of heat dissipation fins 121 are disposed, and the plurality of heat dissipation fins 121 form a periodic structure along at least one direction on the entire heat dissipation plate 122 or the part of the heat dissipation plate 122.

Further, a heat dissipation reflective surface (a virtual reflective surface) 123 composed of tip surfaces or tip points of the plurality of heat dissipation fins 121 is provided. The heat dissipation reflective surface 123 is preferably formed rearward of an antenna radiation surface (a virtual radiation surface) 112 of the antenna element 110 (i.e., on the heat dissipation plate 122 side) or in the same plane as the antenna radiation surface 112. Each of FIGS. 1 and 2 illustrates an example in which the heat dissipation reflective surface 123 is disposed rearward of the antenna radiation surface 112.

The function of the heat dissipation reflective surface 123 will be described below with reference to FIG. 2. An incident wave 201 incident to the heat dissipation reflective surface 123 is reflected on the heat dissipation reflective surface 123 and becomes a reflected wave 202. The reflected wave 202 reaches the antenna radiation surface 112 of the antenna element 110, is combined with a radiation wave 203 from the antenna element 110, and is radiated as a combined wave.

At this time, in order to maintain good antenna characteristics, it is desirable that the reflected wave 202 and the radiation wave 203 be combined in the same phase, that is, in a phase close to the sum of a phase shift amount $\Delta\varphi$ due to reflection on the heat dissipation reflective surface 123 and a phase shift amount $\Delta\theta$ due to an outward propagation between the heat dissipation reflective surface 123 and the antenna radiation surface 112: $\Delta\varphi+\Delta\theta=360°\times n$ (n: a natural number greater than or equal to zero) with regard to a radio wave of a predetermined frequency.

Note that, in the case of reflection on a uniform metal surface (an electric wall), for example, reflection only on the heat dissipation plate 122 where the heat dissipation part 120 does not include the heat dissipation fin 121, $\Delta\varphi=180°$ in an ideal conductor as is generally known. Meanwhile, by forming a group of fins in which a large number of heat dissipation fins 121 according to this example embodiment are periodically arranged, a structure including the heat dissipation reflective surface 123 where $\Delta\varphi\neq180°$ is provided.

An artificial medium in which a specific electromagnetic function is expressed by periodically arranging metal, dielectric, magnetic or other structures such as the heat dissipation fin 121 or by providing a fine structure is referred to as a metamaterial, or as a metasurface especially when the surface structure is focused on.

In particular, regarding a periodic structural metamaterial, as a metamaterial expressing the function of an Electrical Band Gap (EBG) that prevents the propagation of radio waves in a particular frequency band in a structure, a mushroom-shaped EBG structure in which a structure including a metal rod in the center of the metal patch is a unit cell is known.

Figure 3A:
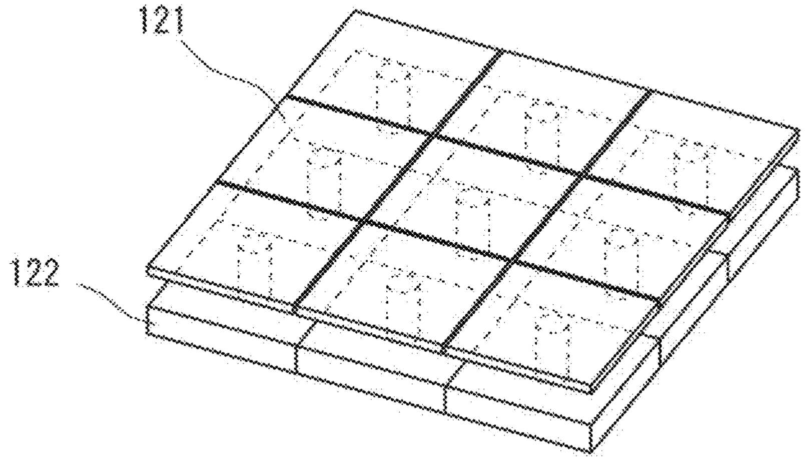
FIG. 3A is a perspective view of a typical mushroom-shaped EBG structure.
Figure 3B:
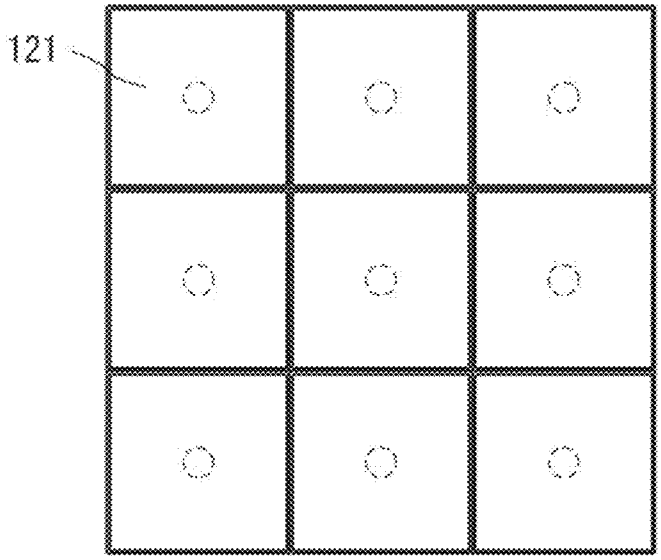
FIG. 3B is an overhead view of the typical mushroom-shaped EBG structure.

Each of FIGS. 3A and 3B illustrates examples of the above EBG structure. In the mushroom-shaped EBG structure, in addition to the prevention of the propagation of radio waves in a structure, the reflective surface composed of a group of metal patches serves as an effective magnetic wall (hereinafter used synonymously with a high impedance plane having a high surface impedance).

Figure 3C:
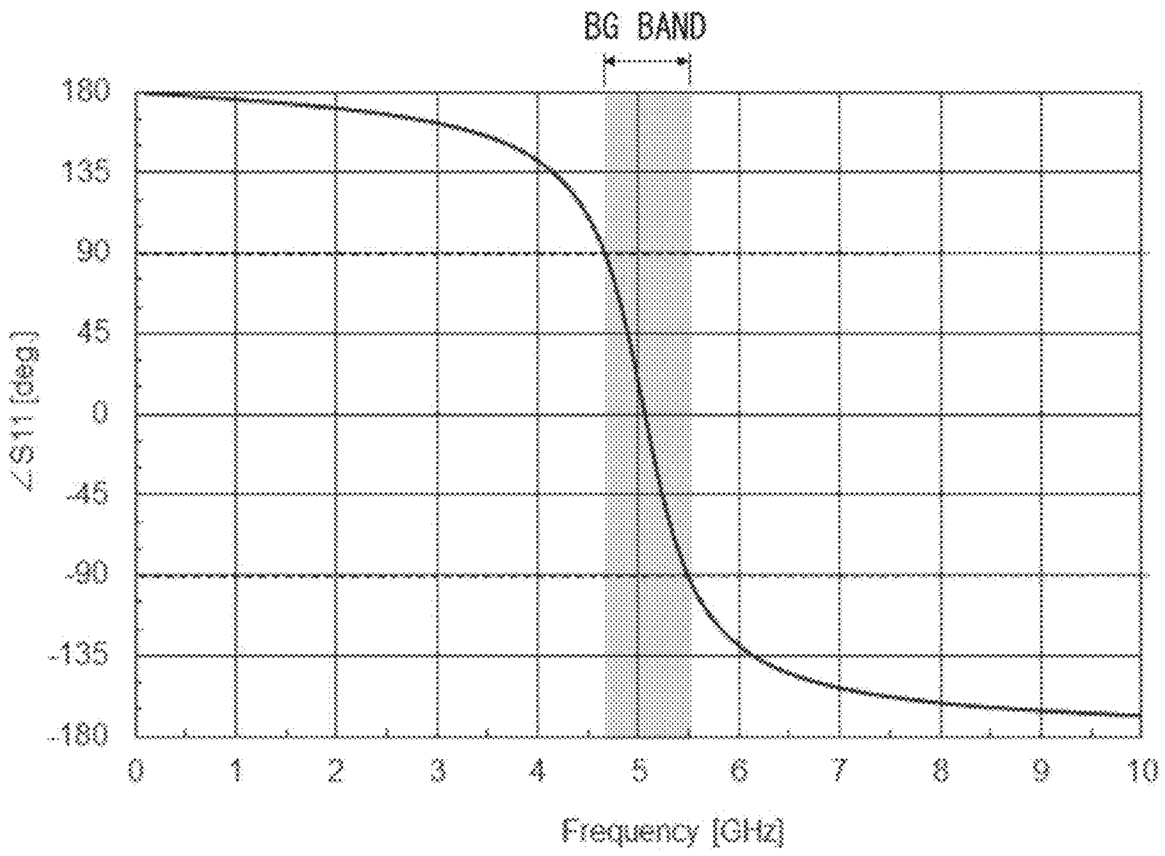
FIG. 3C is a diagram showing a frequency characteristic of the phase of a reflected wave on a metal patch surface of the typical mushroom-shaped EBG structure.

In the reflection at the magnetic wall, a phase shift $\Delta\varphi=180°$ due to the reflection at the electric wall in the ideal conductor, while in the reflection at the ideal magnetic wall, a phase shift $\Delta\varphi=0°$. FIG. 3C shows a calculation example of a frequency characteristic of a phase change due to the reflection of electromagnetic wave from the group of metal patches for the mushroom-shaped EBG structure.

Substantially, as shown in FIG. 3C, a phase-changing frequency domain of −90° to +90° is conventionally considered as a frequency band gap (BG) band. In this example embodiment, a shape is defined so that a group of fins in which a large number of heat dissipation fins 121 are periodically arranged functions as an EBG structure, and so that a reflection phase shift at the heat dissipation reflective surface 123 composed of a plane passing through the tip surfaces of the heat dissipation fins 121 is close to $\Delta\varphi=0°$ in a predetermined frequency band.

Figure 4:
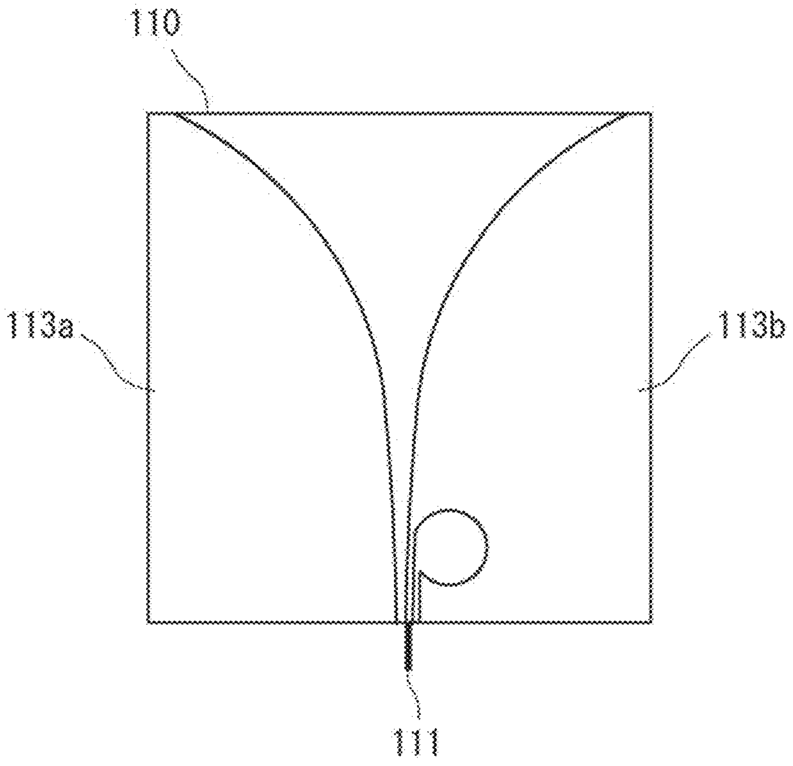
FIG. 4 is a configuration diagram of a Vivaldi antenna element according to the first example embodiment of the present disclosure.
Figure 5A:
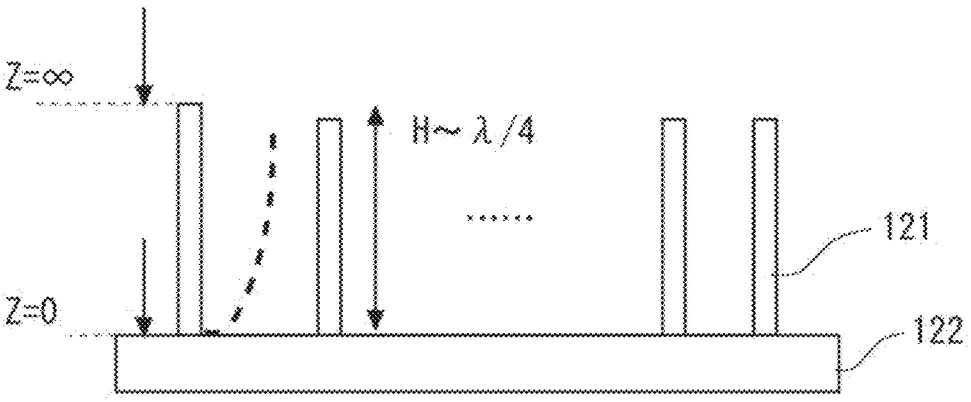
FIG. 5A is a conceptual diagram of impedance conversion to a high impedance surface by a group of heat dissipation fins of ¼ wavelength.
Figure 5B:
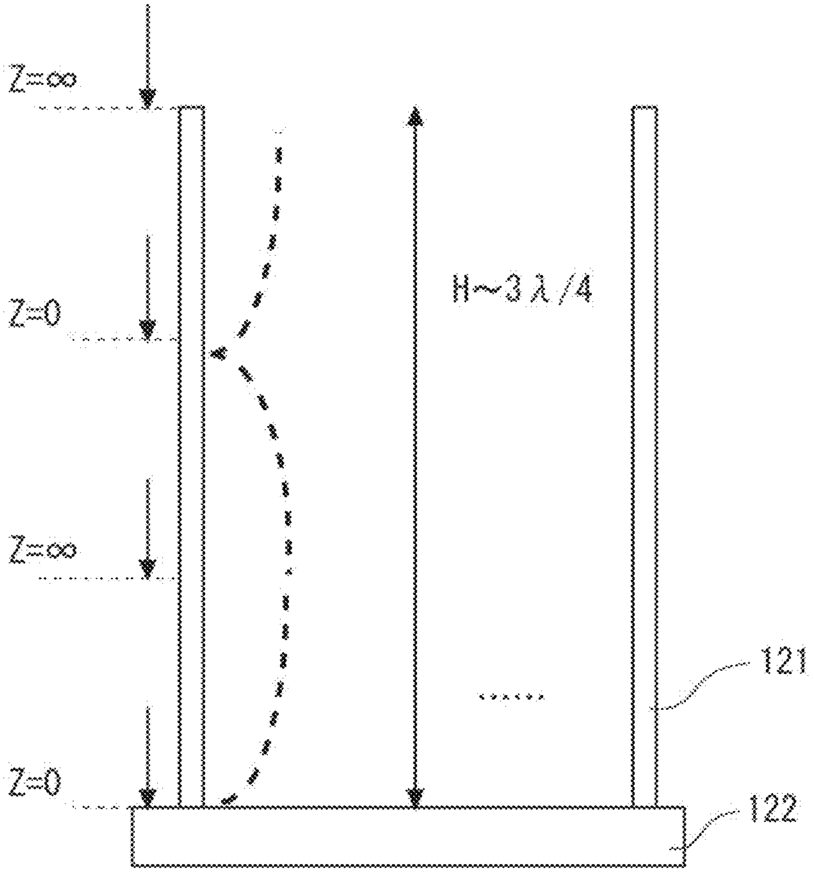
FIG. 5B is a conceptual diagram of impedance conversion to a high impedance surface by a group of heat dissipation fins of ¾ wavelength.

The antenna apparatus 100 according to this example embodiment will be described below with reference to FIGS. 4, 5A, 5B, and 6A to 6D, showing specific structural examples of the antenna element 110 and the heat dissipation part 120. FIG. 4 is a configuration diagram of the antenna element according to this example embodiment, each of FIGS. 5A and 5B is a qualitative conceptual diagram of impedance conversion to a high impedance surface by the heat dissipation fin 121, and FIGS. 6A to 6D are a perspective view (A), a side view (B), a side view (C), and an overhead view (D) of the array antenna apparatus according to this example embodiment, respectively.

The antenna element 110 shown in FIG. 4 is an example of a Vivaldi antenna element having an excellent broadband characteristic in which both of metal patterns 113*a* and 113*b* are provided on a dielectric substrate in an exponential shape. The antenna feeder 111 is connected to the metal pattern 113*b*.

Further, as shown in FIGS. 5A and 5B, by the heat dissipation fin 121 provided on the upper part of the heat radiation plate 122, in particular, when the height of the heat dissipation fin 121 is set to (1+2N)/4 (where N is an integer greater than or equal to zero) of a wavelength $\lambda$ of a predetermined frequency, the heat dissipation reflective surface 123 composed of a group of the heat dissipation fins by impedance conversion includes a high impedance surface having a very high surface impedance. However, the height of the heat dissipation fin 121 may be (N/2+A×¼) (where A is an arbitrary constant of about 0.5 to 1.5) of the wavelength $\lambda$ of the predetermined frequency.

At this time, the phase change due to the reflection of the electromagnetic wave is accompanied by a characteristic equivalent to that in FIG. 3C, and the fins may function as an EBG structure equivalent to a mushroom-shaped EBG. Note that examples of the shape of the heat dissipation fin 121 include a simple pin-like cylindrical shape, a polygonal cylindrical shape, and a flat shape. However, a desired shape may be selected as appropriate without being limited thereto, and combinations of heat dissipation fins having different lengths and shapes and the like may be used in an integrated manner.

Figure 6A:
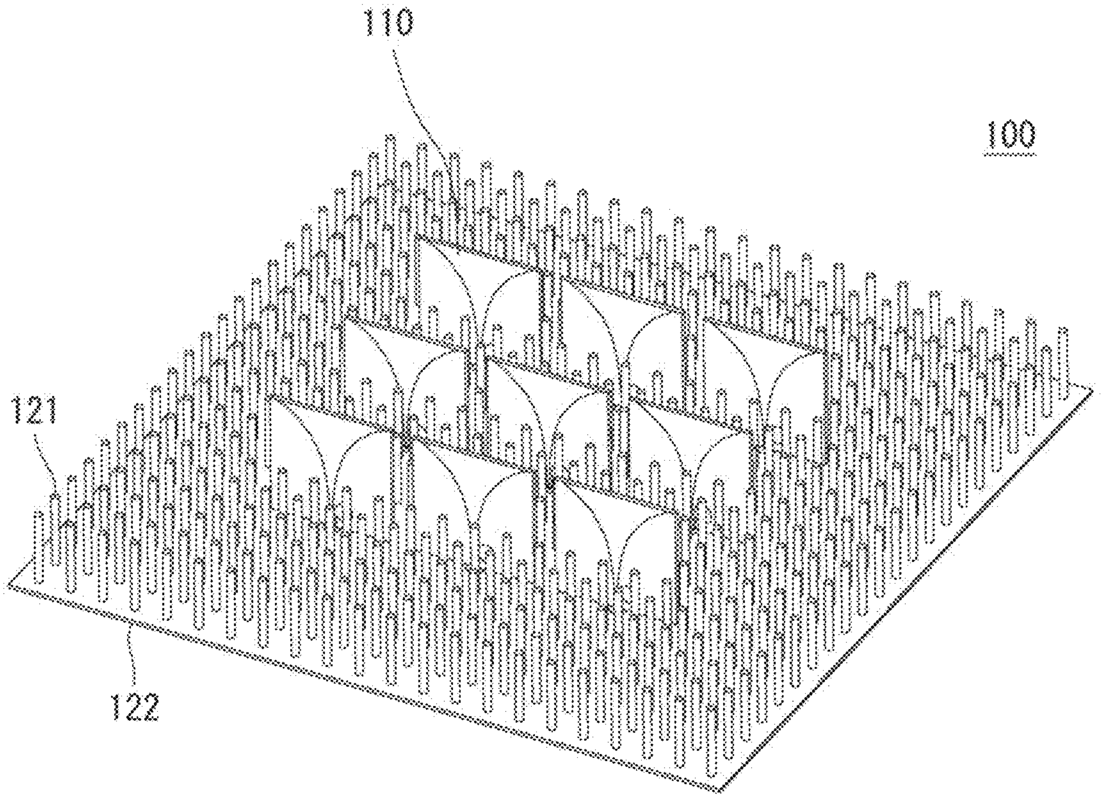
FIG. 6A is a perspective view of an array antenna apparatus according to the first example embodiment of the present disclosure.

As shown in FIG. 6A, the antenna apparatus 100 according to this example embodiment comprises the antenna element 110 composed of the Vivaldi antenna element shown in FIG. 4 and forms a 3×3 array antenna. Further, in the heat dissipation part 120 comprising the heat dissipation fins 121 and the heat dissipation plate 122, the heat dissipation fins 121 are arranged so that a cross section of each of the heat dissipation fins 121 forms a pin-like shape such as a cylindrical shape or a square shape and the heat dissipation fins 121 form a periodic structure on the heat dissipation plate 122.

Figure 6B:
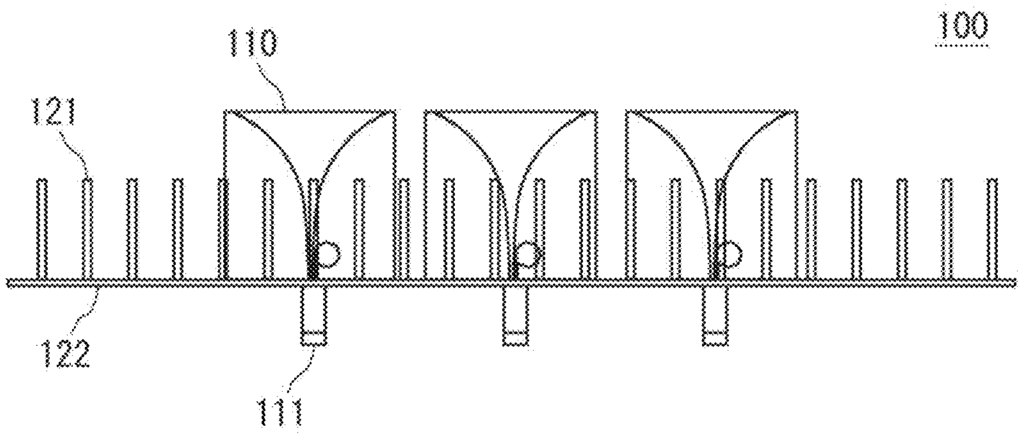
FIG. 6B is a side view of the array antenna apparatus according to the first example embodiment of the present disclosure.
Figure 6C:
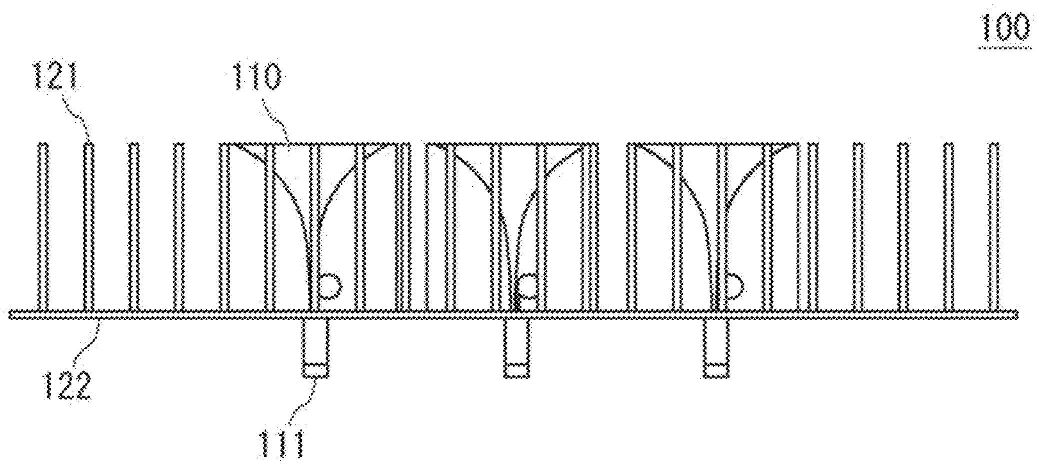
FIG. 6C is a side view of the array antenna apparatus according to the first example embodiment of the present disclosure.

The pin-shaped heat dissipation fin 121 is set to a fin height of 20 mm (¼ length of the wavelength $\lambda$ at 3.7 GHz) in FIG. 6B and a fin height of 33 mm (about 1.5/4 length of the wavelength $\lambda$ at 3.7 GHz) in FIG. 6C.

Further, an operating frequency band of the antenna element 110 is designed to be about 3 to 4.5 GHz, and an antenna height is set to be 33 mm in FIG. 6C like the fin height, and the heat dissipation fins 121 are efficiently arranged by effectively using the envelope space of the area where the antenna element 110 is disposed.

Figure 6D:
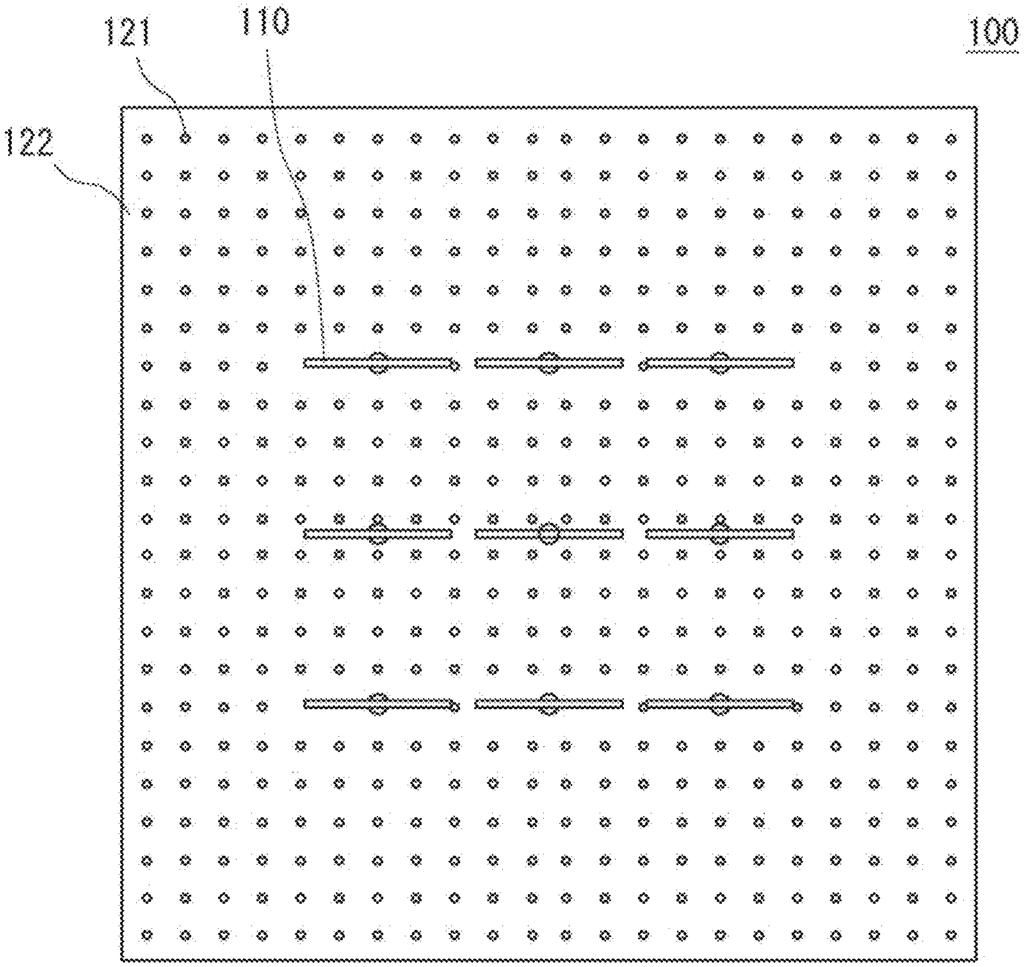
FIG. 6D is an overhead view of the array antenna apparatus according to the first example embodiment of the present disclosure.

Further, since the antenna element 110 according to the present disclosure is vertically mounted on the heat dissipation plate 122, it is suitably used to closely arrange the heat dissipation fins 121 as is apparent from the overhead view of FIG. 6D.

Figure 7A:
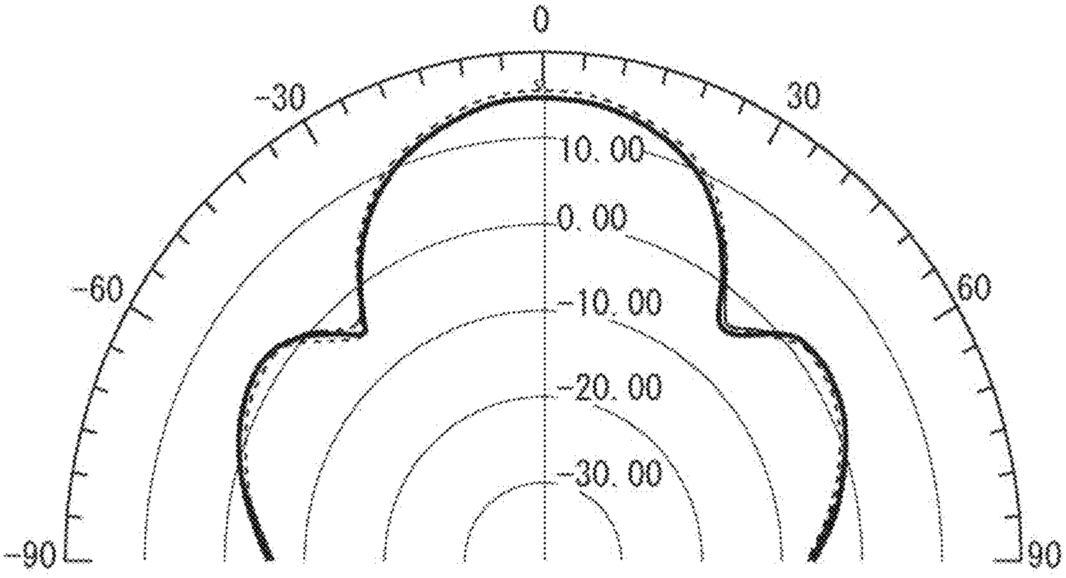
FIG. 7A is a diagram showing a radiation pattern by the array antenna apparatus according to the first example embodiment of the present disclosure.

FIG. 7A shows radiation patterns of the antenna apparatus 100 shown in FIGS. 6A to 6D according to this example embodiment. Note that a dashed line indicates a result of the radiation pattern when only the heat dissipation plate 122 excluding the heat dissipation fin 121 for comparison is provided, that is, only the reflector plate having a uniform metal surface is provided, while each solid line indicates a result of the radiation pattern when a group of the heat dissipation fins 121 having the respective fin heights shown in FIGS. 6B and 6C is provided.

Figure 7B:
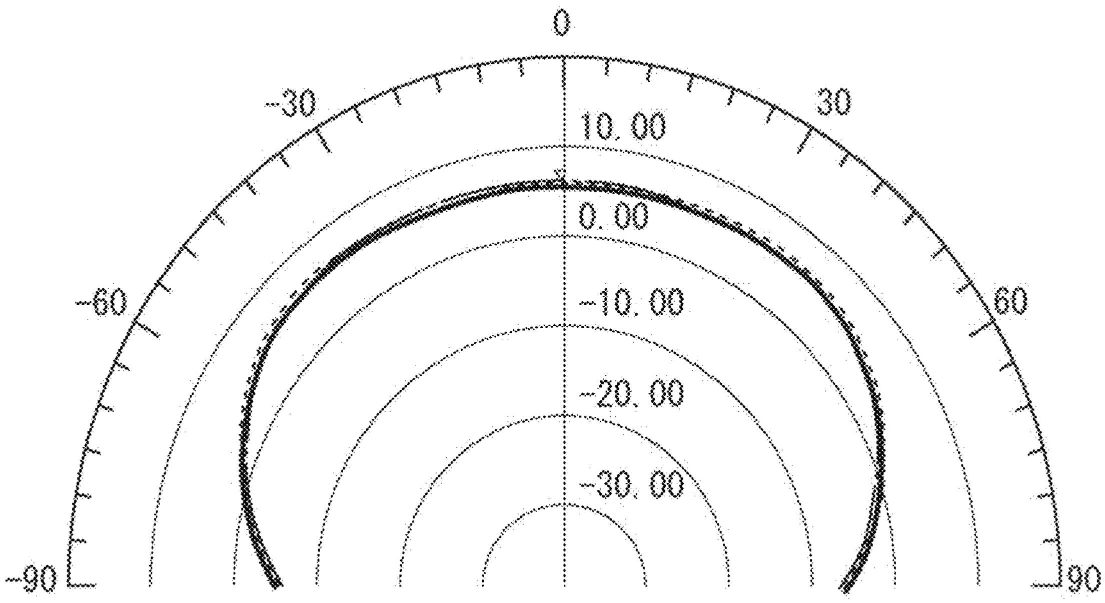
FIG. 7B is a view showing a radiation pattern by a single antenna apparatus according to the first example embodiment of the present disclosure.

Even in the case where the heat dissipation fin 121 is provided, a characteristic roughly equivalent to the antenna characteristics in the case where only the reflector plate having a uniform metal surface is provided can be obtained. Note that, in this example embodiment, although an array antenna including a plurality of antenna elements 110 is clearly shown in FIGS. 6A to 6D, a single antenna element 110 may be used, and as shown in the simulation result of the radiation pattern of the single antenna element shown in FIG. 7B, the same tendency as that in the case of the array antenna can be obtained.

Figure 8A:
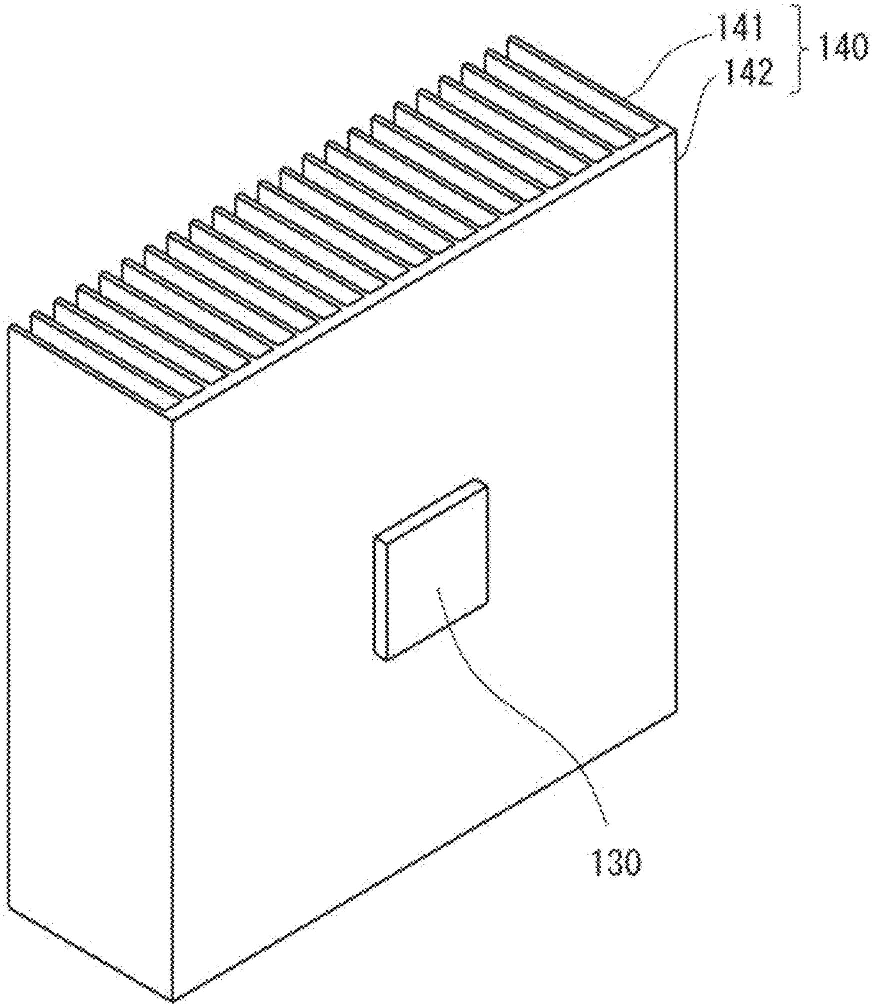
FIG. 8A is a model diagram in a thermal fluid simulation in which an antenna apparatus including a rear surface heat sink according to the first example embodiment of the present disclosure is simulated.

The electromagnetic characteristic of the antenna apparatus 100 according to this example embodiment has been disclosed above, and a thermal characteristic thereof will be described below. FIG. 8A is a model diagram in a thermal fluid simulation in which an antenna apparatus including only a conventional rear side heat dissipation part 140 (a rear side heat dissipation fin 141, a rear side heat dissipation plate 142) on the rear surface thereof is simulated, while FIG. 8B is a model diagram in a thermal fluid simulation in which an antenna apparatus including the heat dissipation part 120 (the heat dissipation fin 121, the heat dissipation plate 122) on the antenna surface side thereof and the rear side heat dissipation part 140 according to this example embodiment is simulated.

Figure 8B:
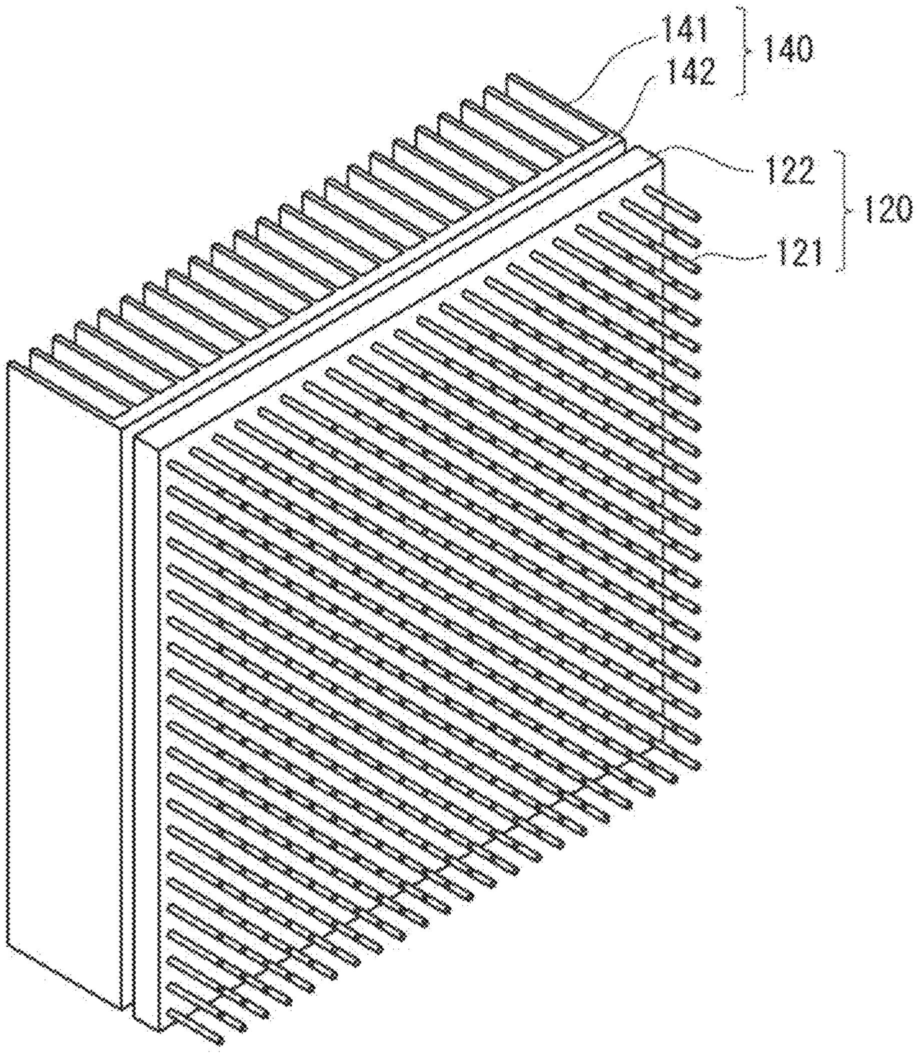
FIG. 8B is a model diagram in a thermal fluid simulation in which an antenna apparatus including an antenna surface heat sink and a rear surface heat sink according to the first example embodiment of the present disclosure is simulated.

Note that a fin height of the rear side heat dissipation fin 141 in FIG. 8A is set to 60 mm, a fin height of the rear side heat dissipation fin 141 in FIG. 8B is set to 35 mm, a fin height of the heat dissipation fin 121 on the antenna surface side in FIG. 8B is set to 20 mm, a plate thickness of each of the heat dissipation plates 122 is set to 5 mm, and an envelope volume of the model in each of FIGS. 8A and 8B is set to be constant.

It is assumed that the heat dissipation member is Aluminum, and a heat source 130 having a constant amount of heat generation is disposed in the central part of the heat dissipation part 120 and the rear side heat dissipation part 140. Note that, in order to simplify the simulation, the antenna element 110 and the like are removed. In FIG. 8B, the heat source 130 is omitted in order to simplify the figure.

Figure 9A:
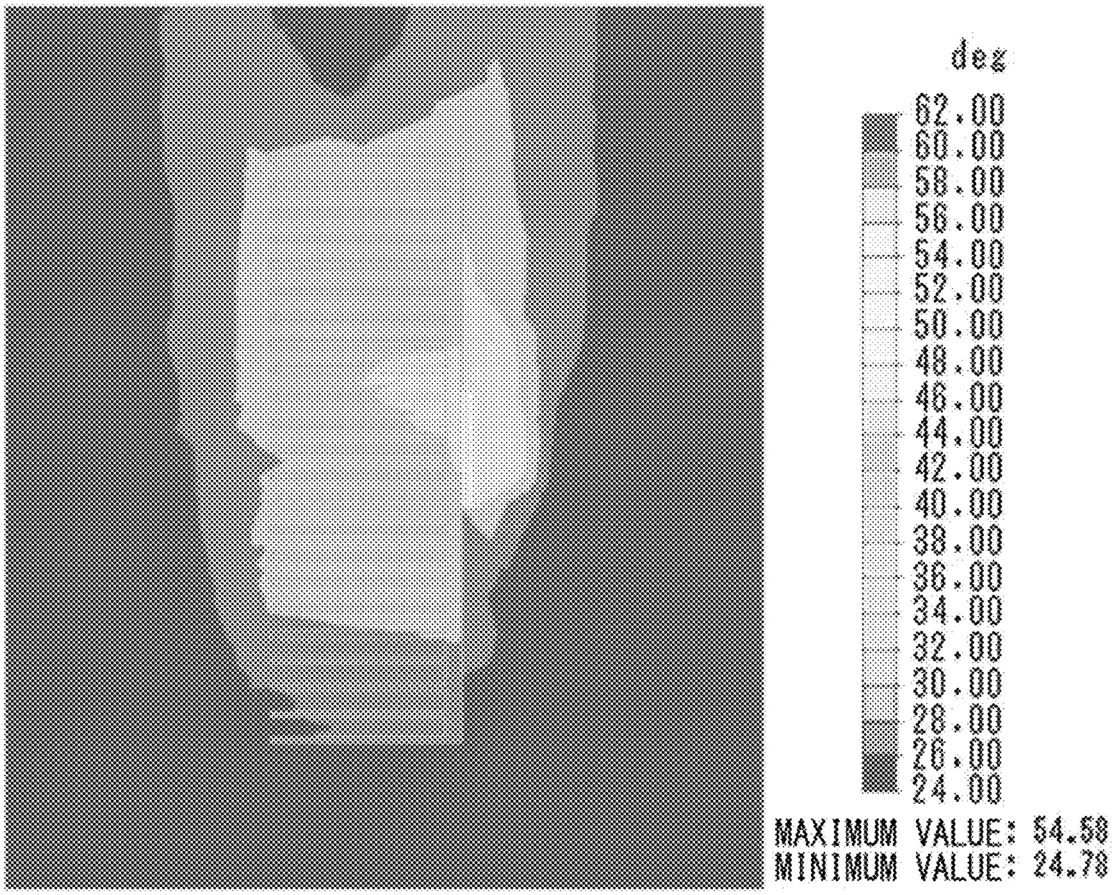
FIG. 9A is a diagram showing an example of temperature distribution of a result of the thermal fluid simulation in which an antenna apparatus including a rear surface heat sink according to the first example embodiment of the present disclosure is simulated.
Figure 9B:
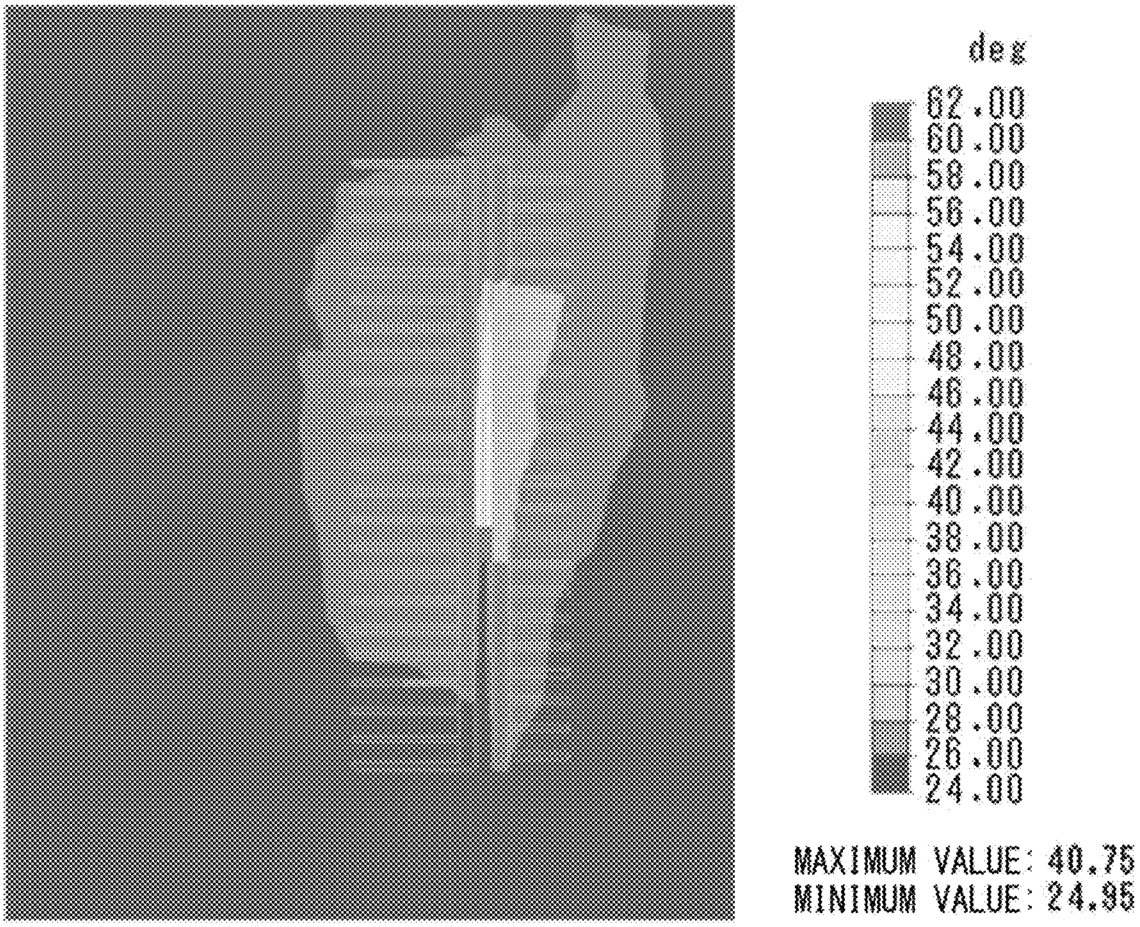
FIG. 9B is a diagram showing an example of temperature distribution of a result of the thermal fluid simulation in which an antenna apparatus including an antenna surface heat sink and a rear surface heat sink according to the first example embodiment of the present disclosure is simulated.

FIG. 9A shows a steady-state temperature distribution of a result of the thermal fluid simulation in which an external wind velocity is set to 1 m/s in the horizontal direction for each heat radiation part in a model simulating an antenna apparatus including a conventional rear side heat dissipation part 140 on the rear surface thereof, while FIG. 9B show a steady-state temperature distribution of a result of the thermal fluid simulation in which an external wind velocity is set to 1 m/s in the horizontal direction for each heat radiation part in a model simulating an antenna apparatus including the heat dissipation part 120 on the antenna surface side thereof and the rear side heat dissipation part 140 according to this example embodiment.

Figure 10:
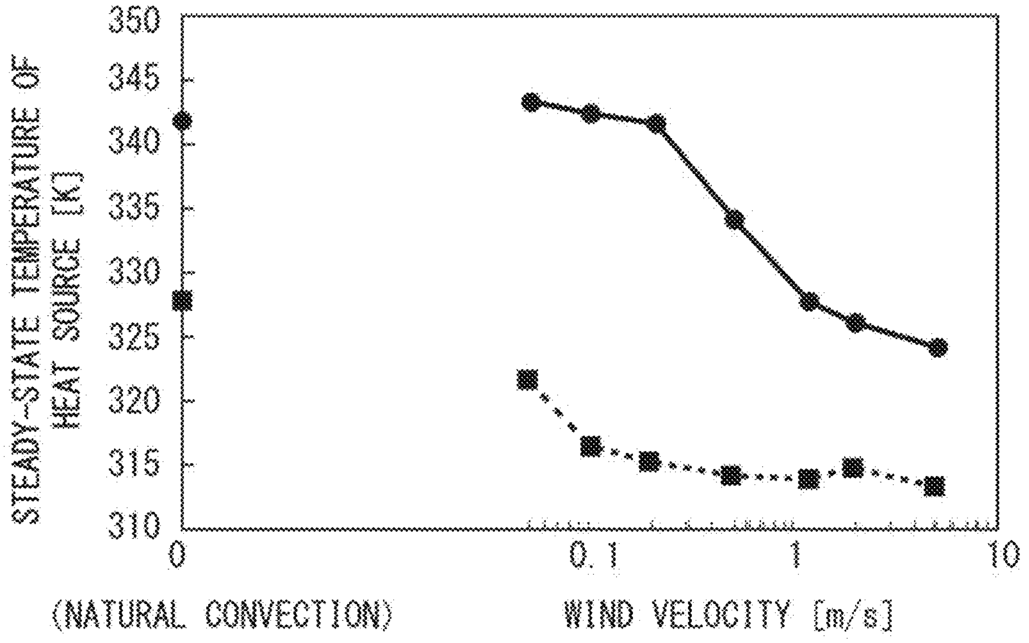
FIG. 10 is a diagram showing a dependence of a steady-state temperature of the heat source on an external wind velocity in a result of a thermal fluid simulation in which the antenna apparatus according to the first embodiment of the present disclosure is simulated.

The steady-state temperature of the heat source 130 is 54° C. when the heat radiation part is provided only on the rear surface, while it is 40° C. when the heat dissipation part 120 is also provided on the antenna surface side, which indicates that the heat dissipation effect is improved. FIG. 10 shows results of the thermal fluid simulation regarding a dependence of a steady-state temperature of the heat source on an external wind velocity for each of the models shown in FIGS. 8A and 8B.

In FIG. 10, marks ● indicate the results of the thermal fluid simulation when the heat dissipation part is provided only on the rear surface, while marks ■ indicate the results of the thermal fluid simulation when the heat dissipation part is also provided on the antenna surface. According to this example embodiment, it can be confirmed that the steady-state temperature of the heat source is efficiently reduced even when there is no wind (natural convection) in addition to when there is an external wind.

That is, as described above, in this example embodiment, since a plurality of heat dissipation fins 121 are arranged so that they form the heat dissipation reflective surface 123 by the tips of the plurality of heat dissipation fins 121, the antenna apparatus 100 having a high heat dissipation performance can be manufactured at a low cost while maintaining the antenna characteristic. Further, since the heat dissipation performance is high even when a small heat dissipation part 120 is used, the size of the antenna apparatus 100 can be reduced.

Second Example Embodiment

Figure 11:
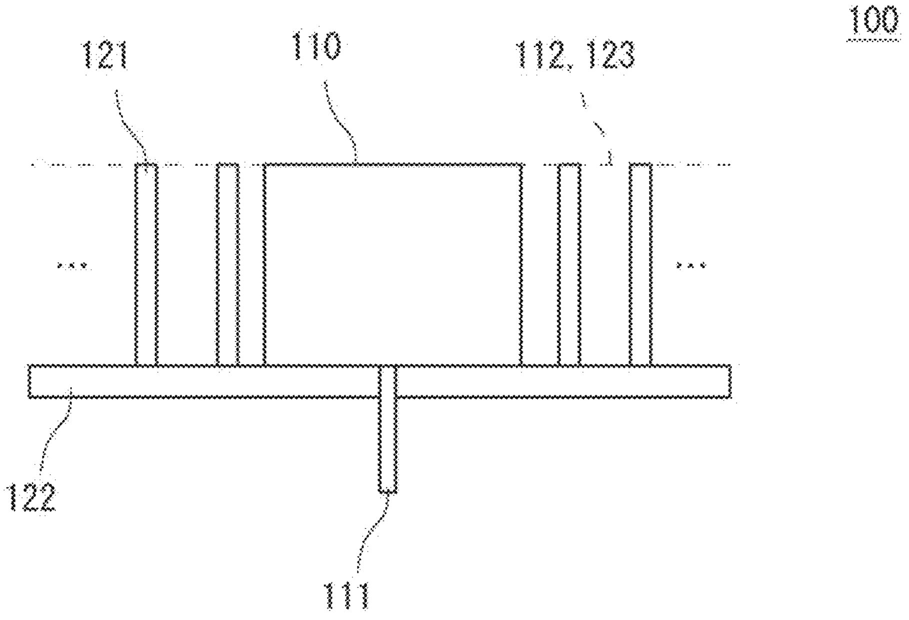
FIG. 11 is a schematic diagram of a side surface of an antenna apparatus according to a second example embodiment of the present disclosure.
Figure 12A:
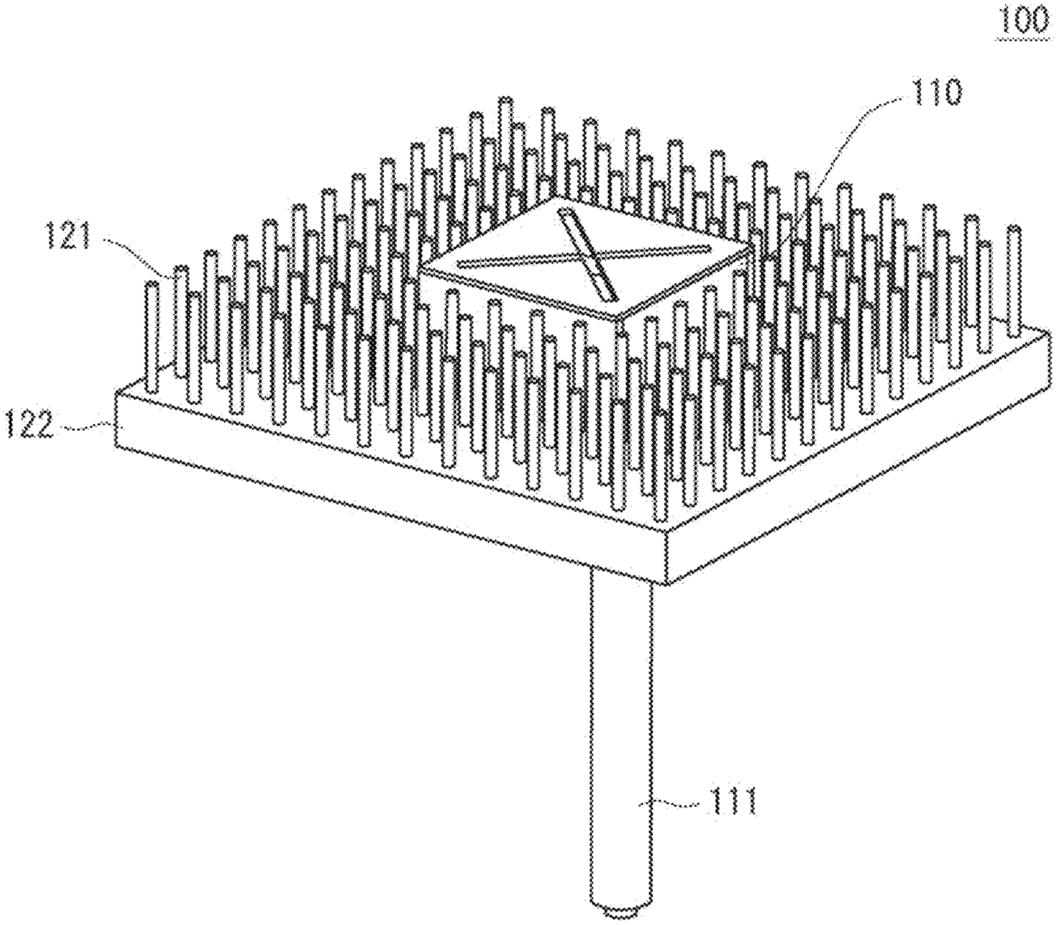
FIG. 12A is a perspective view of an antenna apparatus to which a pin-shaped cylindrical heat dissipation fin having a height of ¼ wavelength according to the second example embodiment of the present disclosure is applied.
Figure 12B:
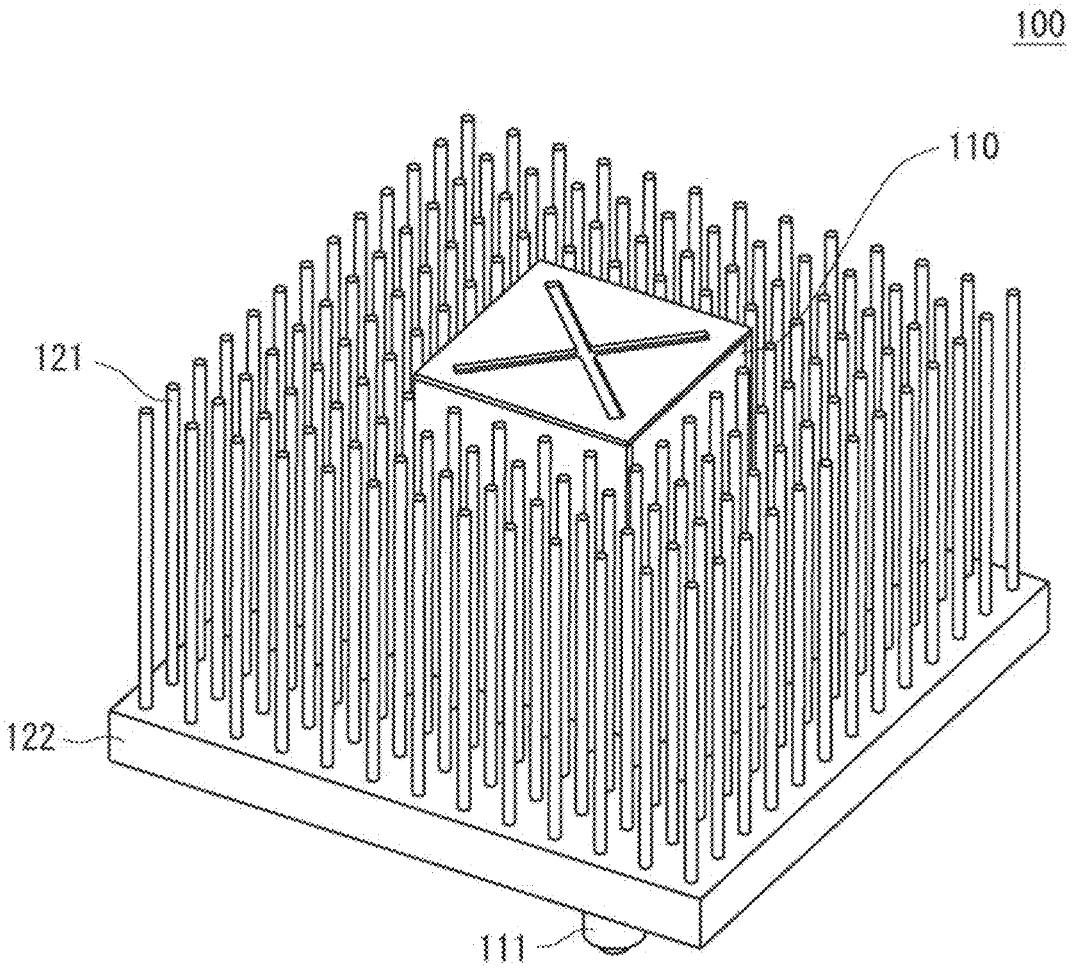
FIG. 12B is a perspective view of an antenna apparatus to which a pin-shaped cylindrical heat dissipation fin having a height of ¾ wavelength according to the second example embodiment of the present disclosure is applied.
Figure 12C:
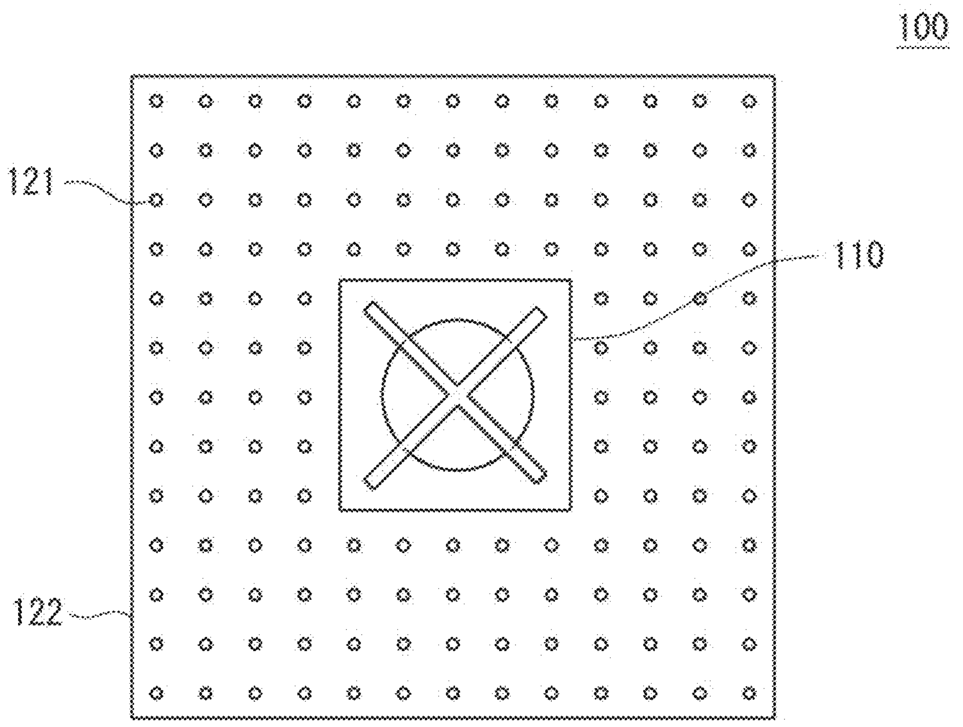
FIG. 12C is an overhead view of an antenna apparatus to which a pin-shaped cylindrical heat dissipation fin according to the second example embodiment of the present disclosure is applied.
Figure 13A:
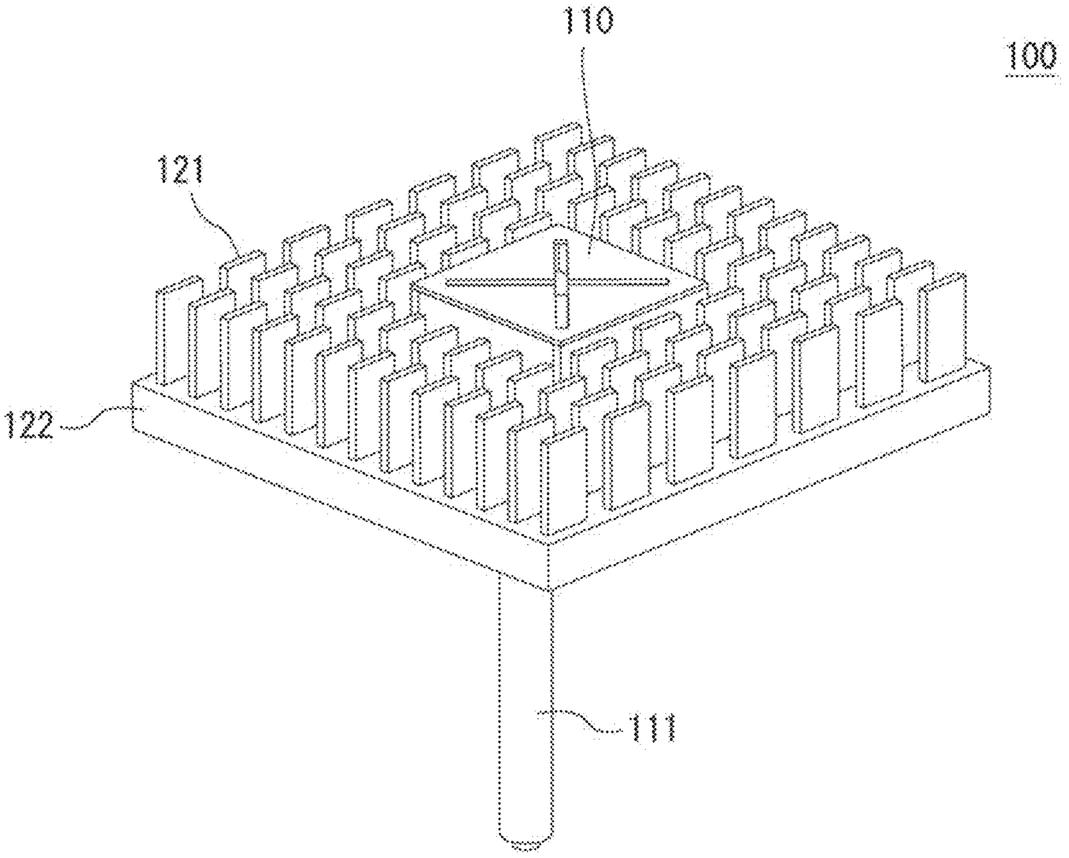
FIG. 13A is a perspective view of an antenna apparatus to which a flat-shaped heat dissipation fin having a height of ¼ wavelength according to the second example embodiment of the present disclosure is applied.
Figure 13B:
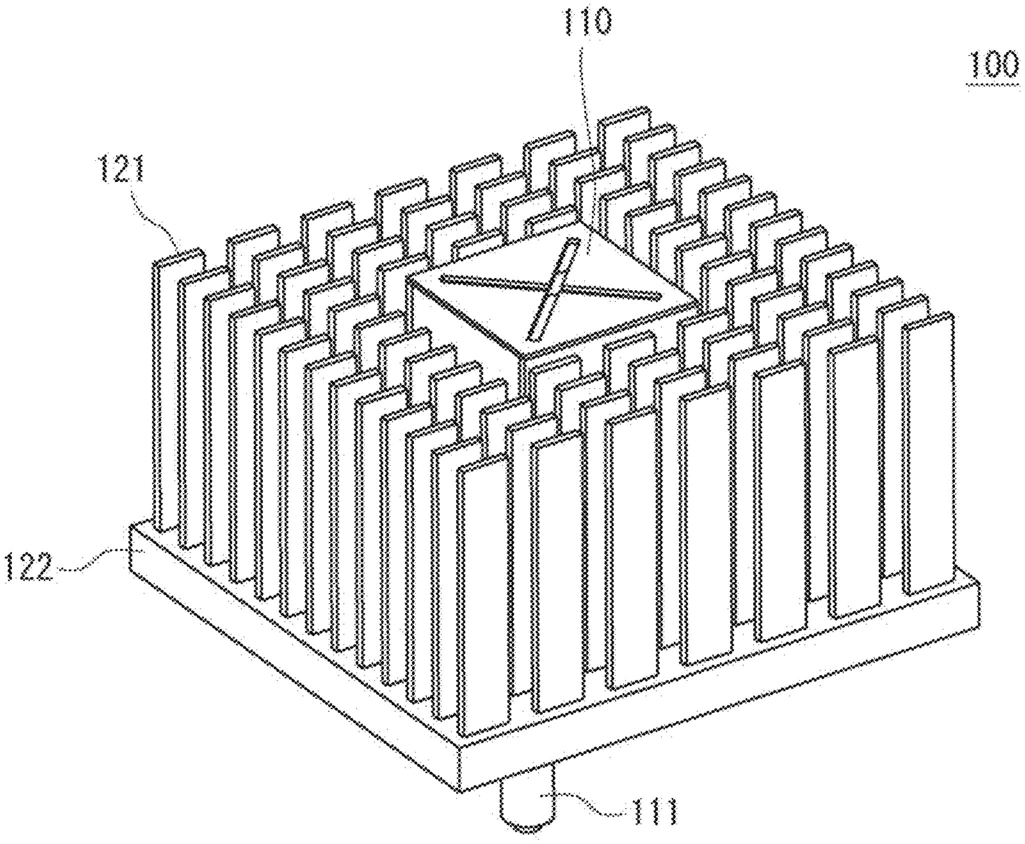
FIG. 13B is a perspective view of an antenna apparatus to which a flat-shaped heat dissipation fin having a height of ¾ wavelength according to the second example embodiment of the present disclosure is applied.
Figure 13C:
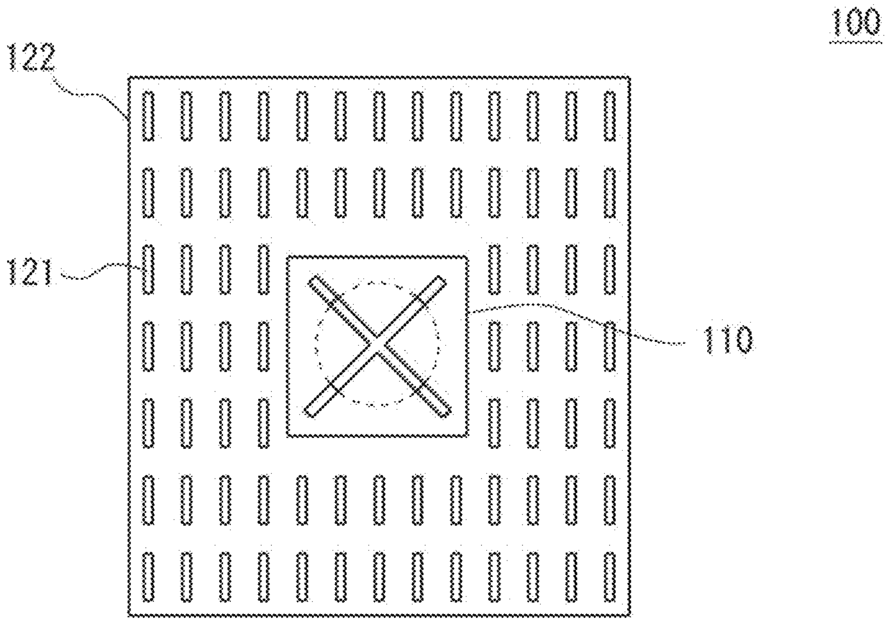
FIG. 13C is an overhead view of an antenna apparatus to which a flat-shaped heat dissipation fin according to the second example embodiment of the present disclosure is applied.

An antenna apparatus according to this example embodiment will be described with reference to FIGS. 11, 12A to 12C, and 13A to 13C. FIG. 11 is a schematic diagram of a cross section of the antenna apparatus 100 according to this example embodiment. Each of FIGS. 12A to 12C shows an example of an antenna apparatus in which the heat dissipation fin 121 of the antenna apparatus 100 according to this example embodiment has a pin-like cylindrical shape, while each of FIGS. 13A to 13C shows an example of an antenna apparatus in which the heat dissipation fin 121 of the antenna apparatus 100 according to this example embodiment has a flat shape. Each of FIGS. 12A, 12B, 13A, and 13B is a perspective view of the antenna apparatus 100, while each of FIGS. 12C and 13C is an overhead view of the antenna apparatus 100.

Note that, as an example of the antenna element 110, a planar-type cross-slot antenna including a primary radiator of a disk patch is applied, and in the antenna apparatus 100 shown in FIGS. 12A and 13A, the heat dissipation fin 121 having a fin height of 20 mm (¼ length of the wavelength λ at a predetermined frequency) is applied. Further, in the antenna apparatus 100 shown in FIGS. 12B and 13B, the heat dissipation fin 121 having a fin height of 60 mm (¾ length of the wavelength λ at a predetermined frequency) is applied.

As a comparison between the characteristics of the antenna apparatuses 100 shown in FIGS. 12A to 12C and 13A to 13C, FIG. 14A shows a perspective view of the antenna apparatus 100 showing an ideal reflection characteristic as a reflective surface and an EBG surface. Specifically, it shows an antenna apparatus in which the shape of the heat dissipation fin 121 is a block shape in which the heat dissipation plate is extended in the direction of the antenna surface, the heat dissipation reflective surface is provided in the same plane as the antenna radiation surface, and an ideal magnetic wall condition that is virtually uniform is imposed on a boundary wall 301 for the heat dissipation reflective surface.

Figure 14A:
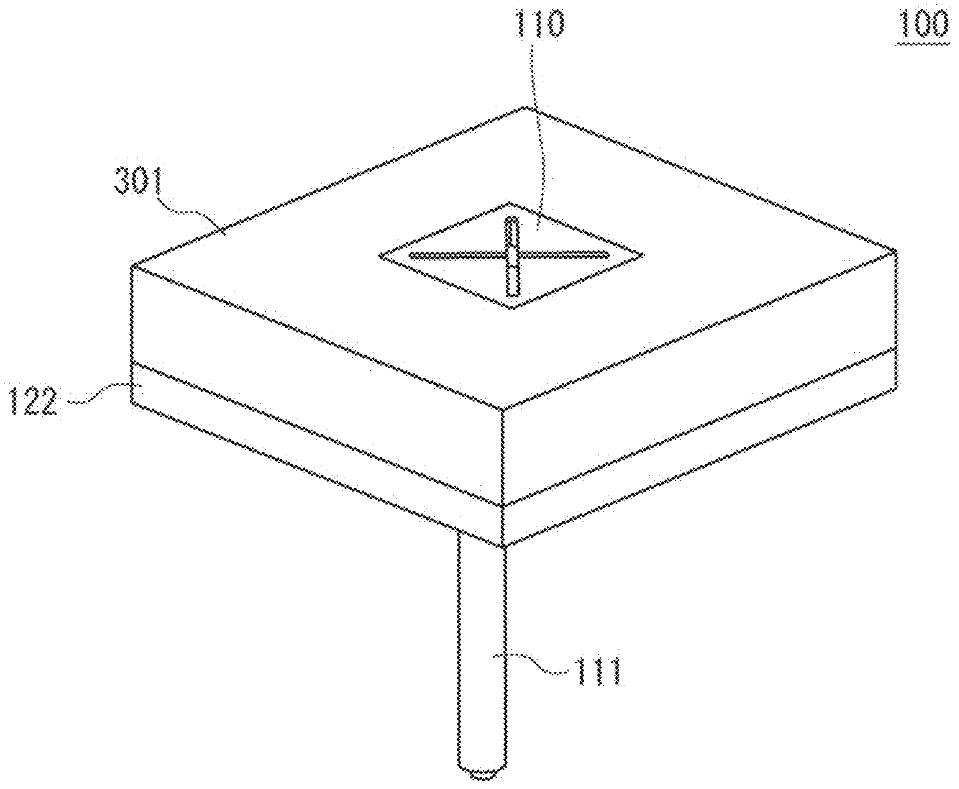
FIG. 14A is a perspective view of an antenna apparatus in which an ideal magnetic wall is applied as a boundary wall onto the same plane as an antenna radiation surface, which is a comparative example according to the second example embodiment of the present disclosure.
Figure 14B:
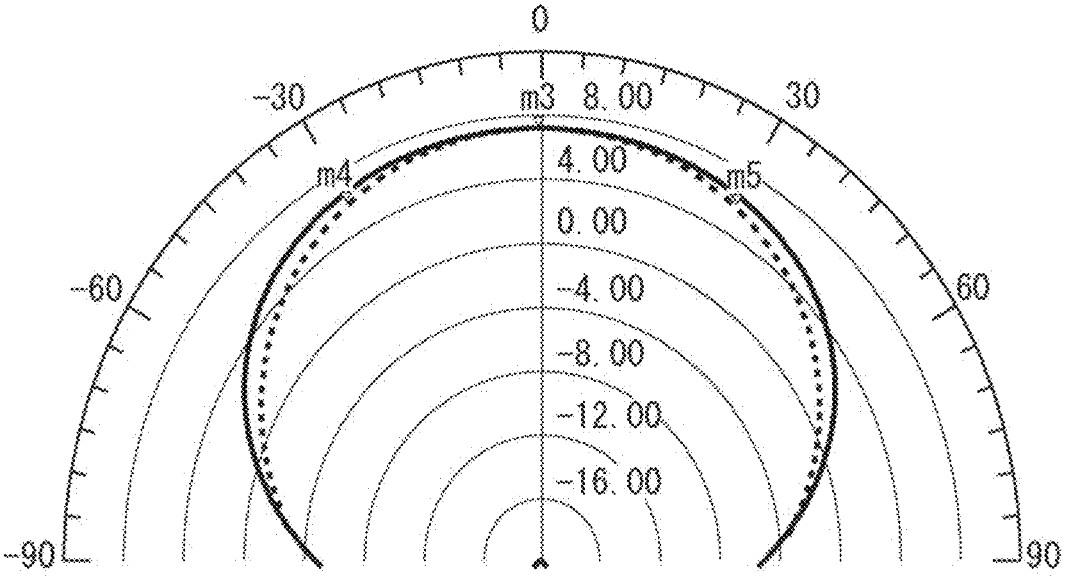
FIG. 14B is a diagram showing a radiation pattern by the antenna apparatus in which an ideal magnetic wall is applied as a boundary wall onto the same plane as an antenna radiation surface, which is a comparative example according to the second example embodiment of the present disclosure.
Figure 15A:
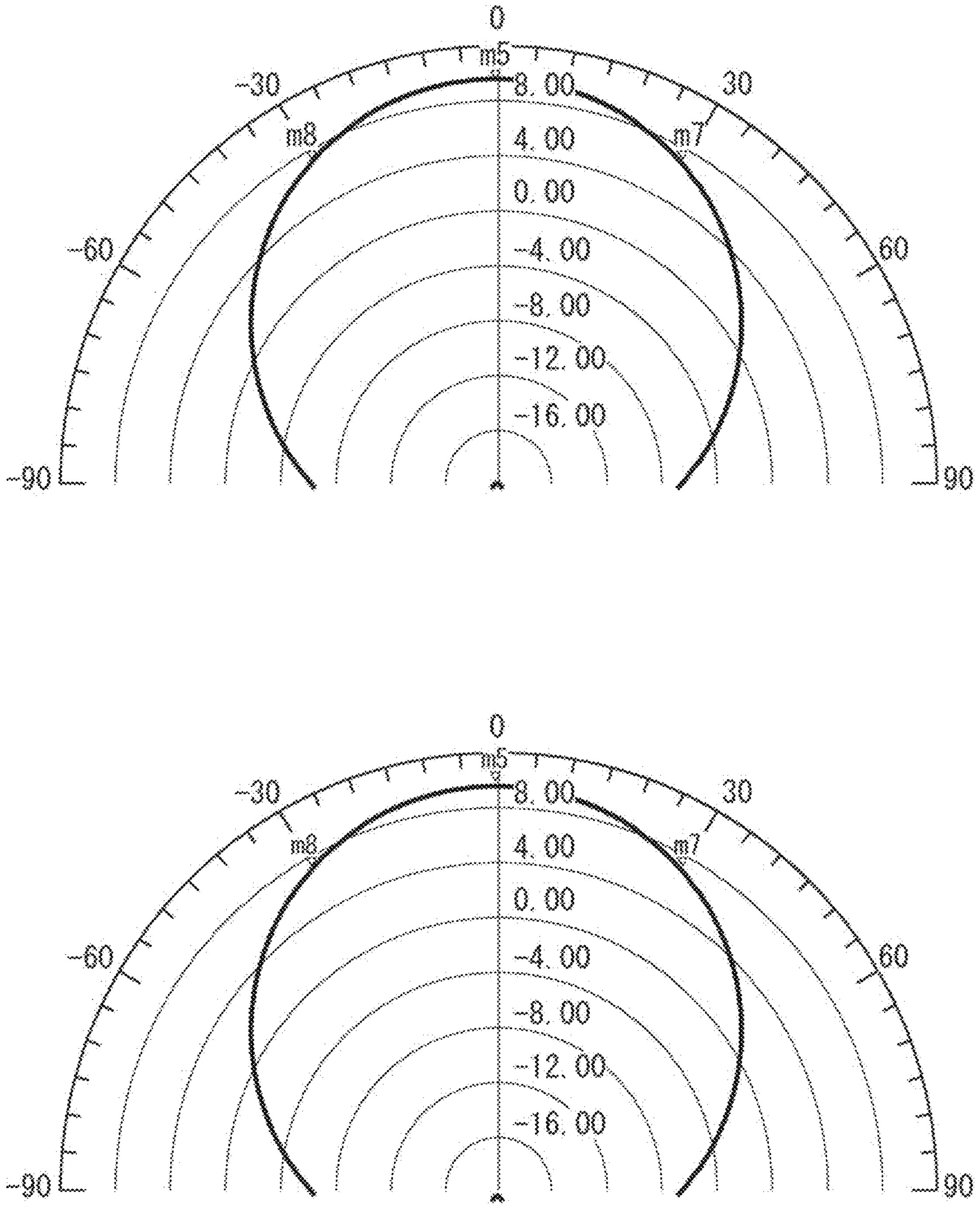
FIG. 15A is a diagram showing a radiation pattern by a single antenna apparatus when a heat dissipation fin having a height of ¼ wavelength is loaded according to the second example embodiment of the present disclosure.
Figure 15B:
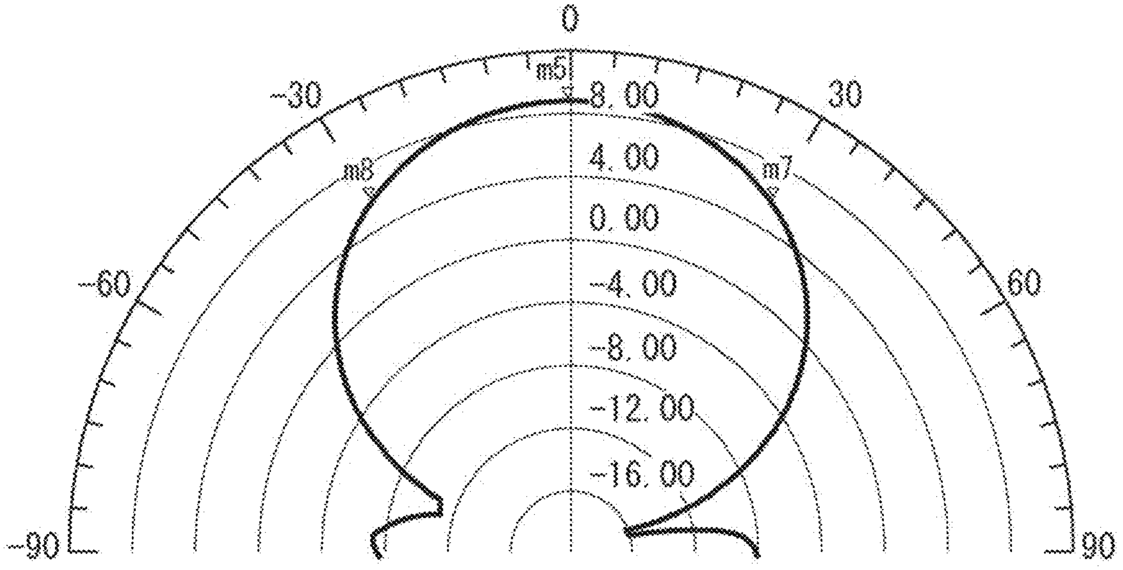
FIG. 15B is a diagram showing a radiation pattern by a single antenna apparatus when a heat dissipation fin having a height of ¾ wavelength is loaded according to the second example embodiment of the present disclosure.
Figure 15B:
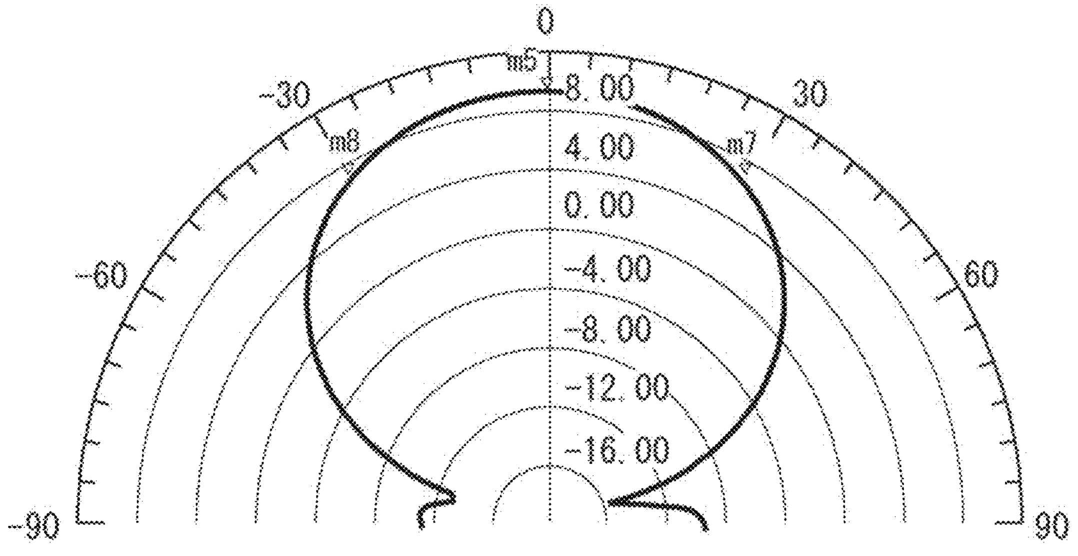

The radiation pattern of the antenna apparatus 100 shown in FIGS. 12A to 12C according to this example embodiment and the radiation pattern of the antenna apparatus 100 shown in FIGS. 13A to 13C according to this example embodiment are shown in FIGS. 15A and 15B. In FIG. 15A, the antenna characteristic in the case of the pin-shaped fin having the fin height of 20 mm is shown in the upper part, and the antenna characteristic in the case of the flat-shaped fin having the fin height of 20 mm is shown in the lower part. Further, in FIG. 15B, the antenna characteristic in the case of the pin-shaped fin having the fin height of 60 mm is shown in the upper part, and the antenna characteristic in the case of the flat-shaped fin having the fin height of 60 mm is shown in the lower part. Although the directivity is slightly higher than that in the case in which the ideal condition shown in FIG. 14B is imposed, the high antenna gain is maintained and the antenna characteristic is prevented from deteriorating.

Note that, although the case of a single antenna element has been described in this example embodiment, the present disclosure may be extended to an array antenna apparatus using a plurality of antenna elements.

Other Example Embodiments

In the above example embodiments, although heat dissipation fins of the same fin length are applied, a combination of different fin lengths can be used as appropriate. For example, each of FIG. 16A (perspective view) and FIG. 16B (side view) shows a Vivaldi antenna apparatus to which a plurality of types of the heat dissipation fins having different heat dissipation fin lengths are applied.

Since it is advantageous to provide a certain amount of area of a ground plate under the antenna element 110 near the antenna feeder 111 in the Vivaldi antenna apparatus in terms of the antenna characteristic, a base of the conductor is provided under the antenna element 110, and a short fin is applied only to a heat dissipation fin 121*b* near the antenna element 110.

Figure 16A:
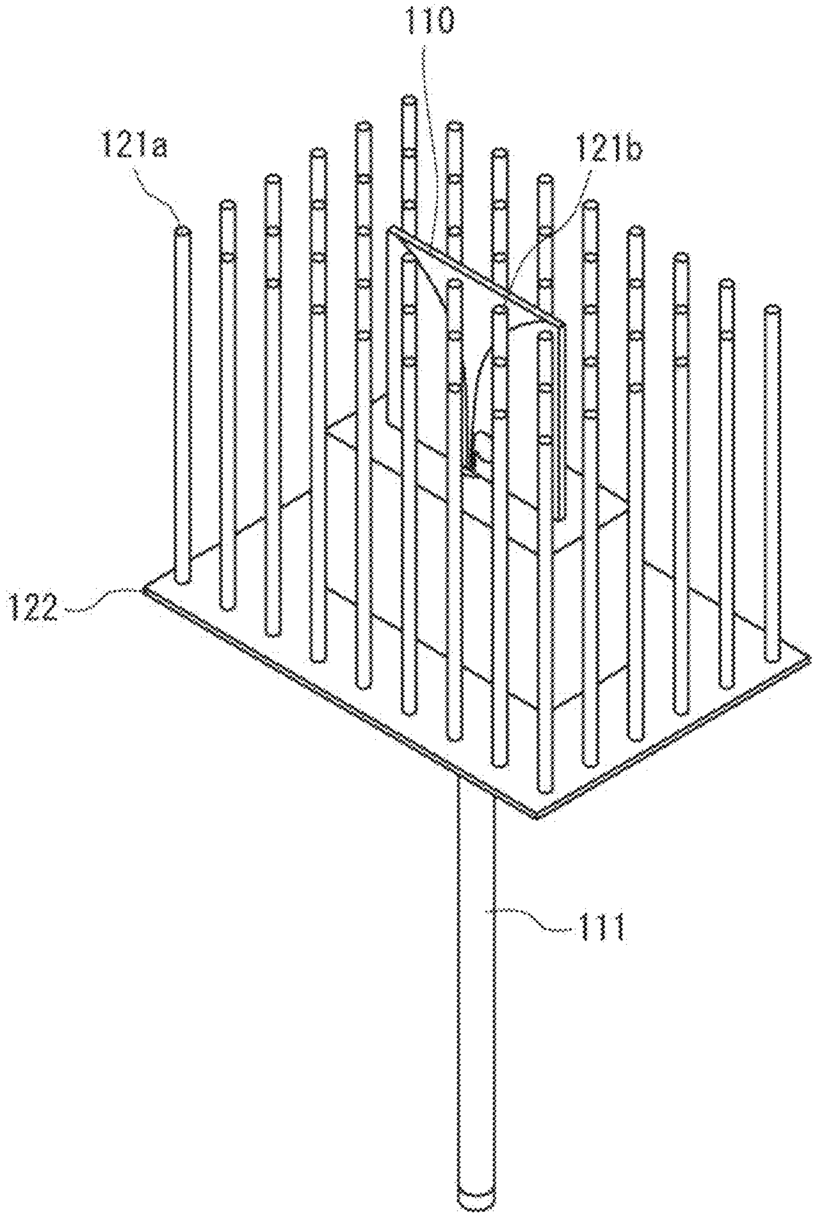
FIG. 16A is a perspective view of an antenna apparatus in which heat dissipation fins having different lengths are loaded according to an example embodiment of the present disclosure.
Figure 16B:
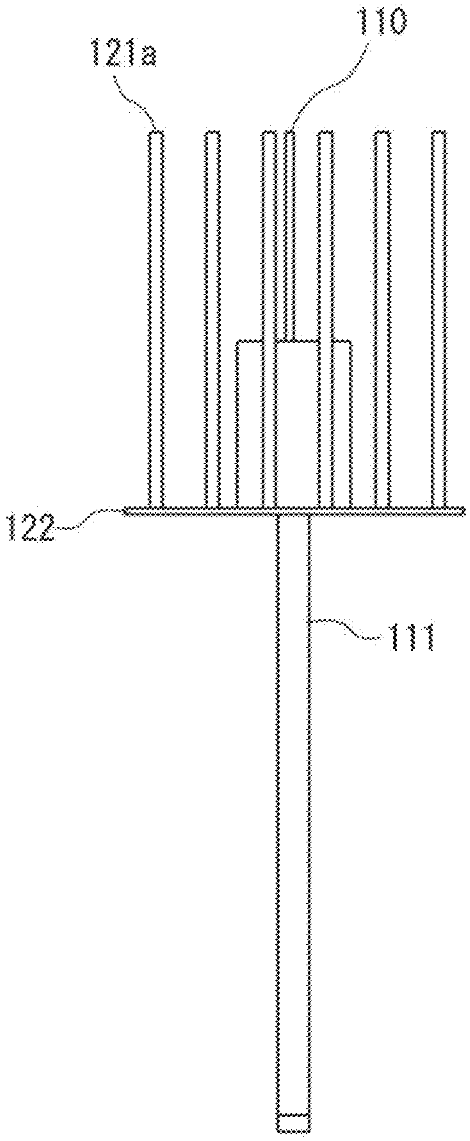
FIG. 16B is a side view of the antenna apparatus loaded in which heat dissipation fins having different lengths are loaded according to an example embodiment of the present disclosure.

Each of FIGS. 16A and 16B shows an example in which one row of the short heat dissipation fins 121*b* is applied onto the base. In addition, a high heat dissipation fin 121*a*, such as ⅔ wavelength, is applied to the surrounding area lower than the bases of other conductors in order to improve the heat dissipation area. As described above, in consideration of the characteristic of the antenna element to be applied and the optimization of the air flow for heat dissipation, the fins can be used in combination as appropriate.

Figure 17A:
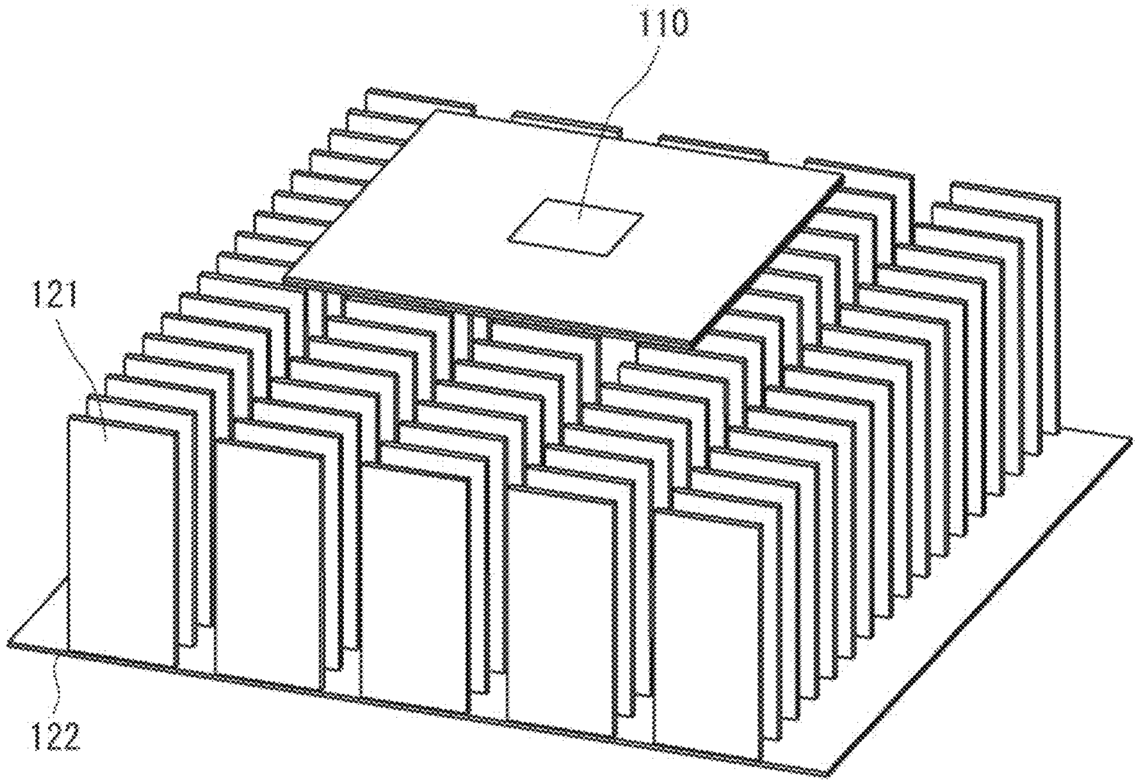
FIG. 17A is a perspective view of an antenna apparatus to which a patch antenna element according to an example embodiment of the present disclosure is applied.
Figure 17B:
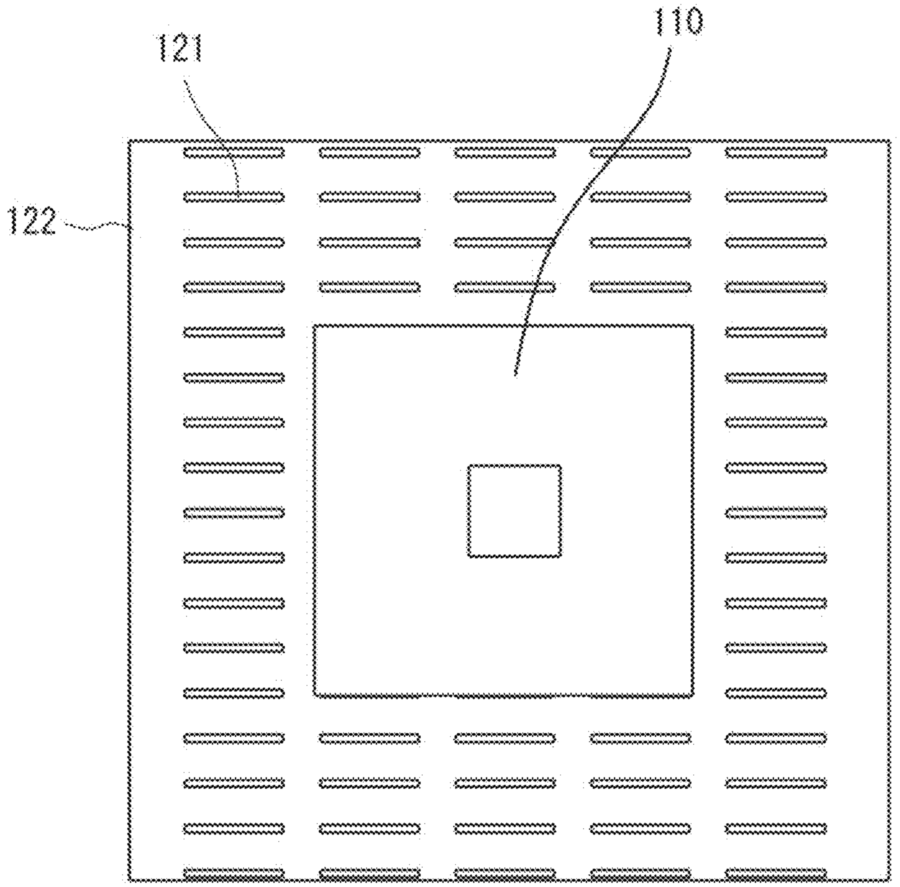
FIG. 17B is an overhead view of the antenna apparatus to which a patch antenna element according to an example embodiment of the present disclosure is applied.

In the above first and second example embodiments, as the antenna element 110, a Vivaldi antenna provided vertically on the substrate surface and a planar-type cross-slot antenna have been described as examples of the form. However, other antenna elements, such as a horn antenna and a patch antenna element as shown in FIGS. 17A (perspective view) and 17B (overhead view), may instead be used. Further, the present disclosure is not limited thereto, and a desired antenna element can be selected as appropriate, and combinations of different antenna elements and the like may be used in an integrated manner.

Figure 18A:
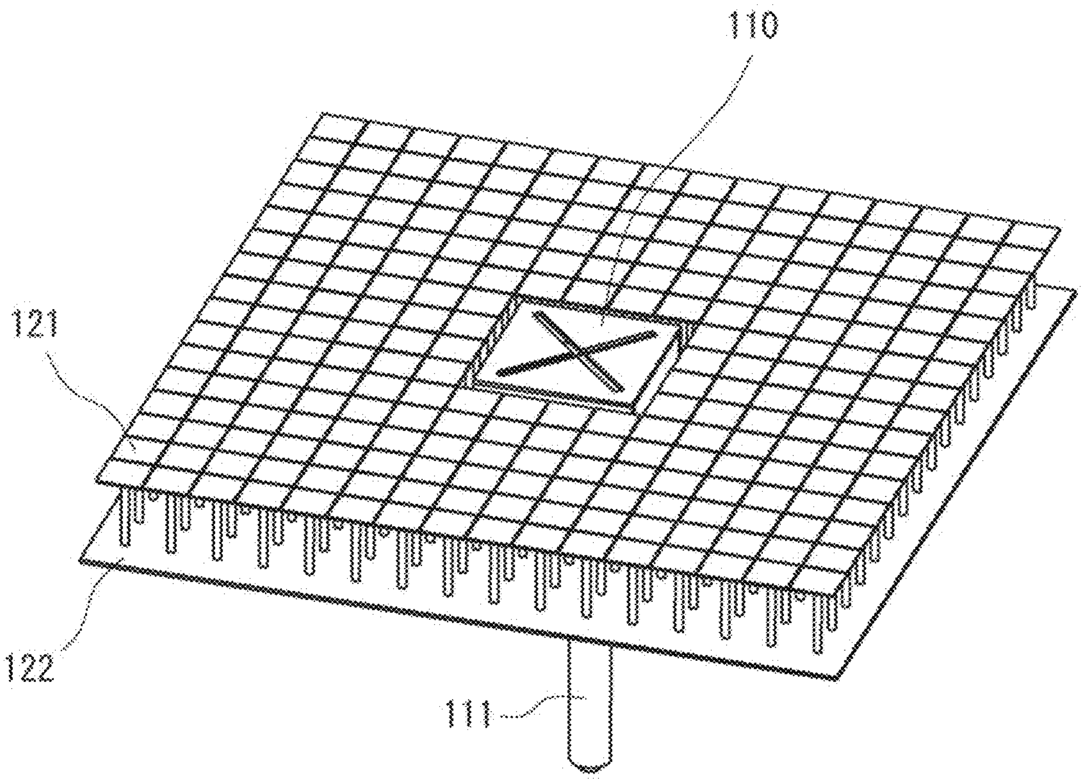
FIG. 18A is a perspective view of an antenna apparatus including a patch element at the tip of a heat dissipation fin according to an example embodiment of the present disclosure.
Figure 18B:
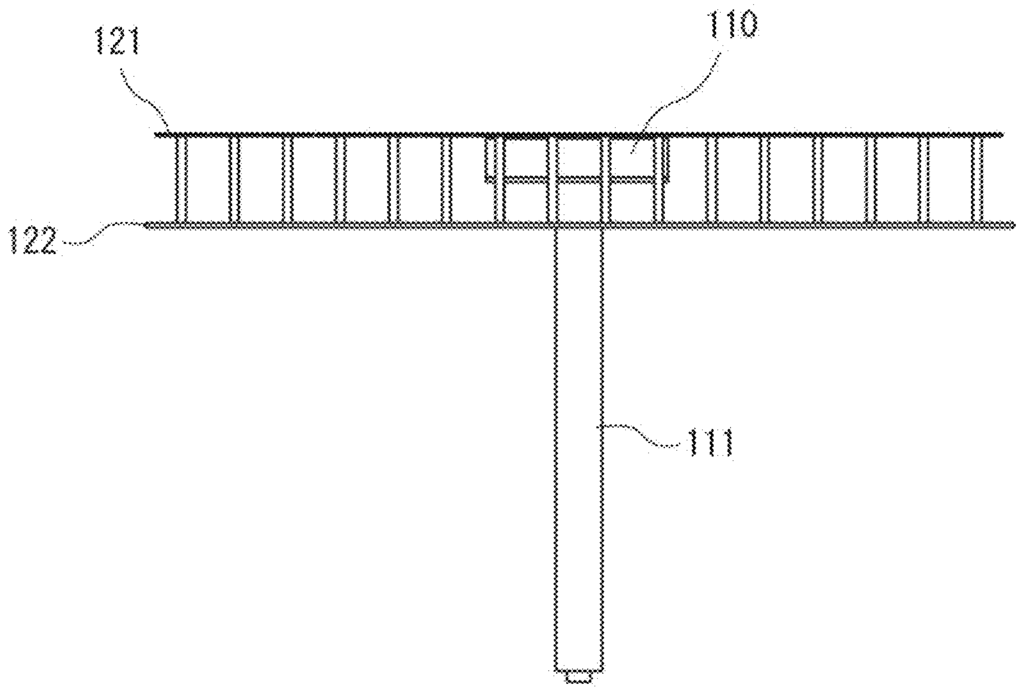
FIG. 18B is a side view of the antenna apparatus including a patch element at the tip of a heat dissipation fin according to an example embodiment of the present disclosure.

Further, in the above first and second example embodiments, a pin-like shape and a flat shape are shown as examples of the heat dissipation fin. However, as shown in FIGS. 18A (perspective view) and 18B (side view), a form in which a metal patch is loaded at the tip of the heat dissipation fin body may also be included as a form of the heat dissipation fin 121.

In this case, the patch part functions as an element that generates a parasitic capacitance with the surrounding group of patches, and by adjusting shapes such as a thickness of the tip metal patch and a distance (metal patch width, pin spacing) between the patch part and the surrounding metal patch, a parasitic capacitance component between the patch part and the surrounding heat dissipation fin can be changed. Thus, it is possible to provide a heat dissipation fin in which an electrical characteristic is adjusted.

Figure 18C:
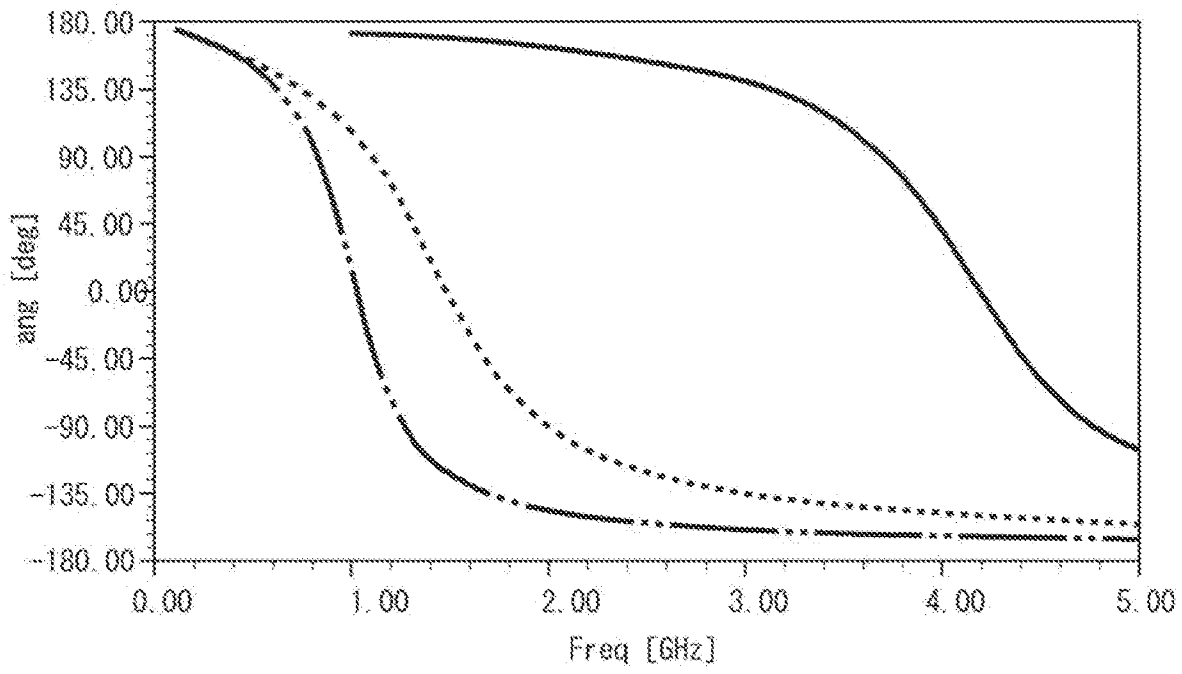
FIG. 18C is a diagram showing a frequency characteristic of a phase change of a reflected wave on a metal patch surface when the height of a pin and the thickness of a metal patch of each heat dissipation fin according to an example embodiment of the present disclosure are changed.

As a result, the height of the column part (the heat dissipation fin body) is not limited to a defined height such as ¼ or ¾ wavelength relative to a predetermined frequency and may also be reduced. FIG. 18C shows a frequency characteristic of a phase change of a reflected wave on a metal patch surface when the height of a pin and the thickness of a metal patch of each heat dissipation fin 121 are changed.

Note that, in FIG. 18C, a solid line shows a frequency characteristic when the height of the heat dissipation fin body is 3 mm and a thickness of the metal patch is 0.5 mm, a dashed line shows a frequency characteristic when the height of the heat dissipation fin body is 20 mm and the thickness of the metal patch is 0.5 mm, and a dash-dot-dot line shows a frequency characteristic when the height of the heat dissipation fin body is 20 mm and the thickness of the metal patch is 2 mm.

The EBG band in which the reflection phase is in the range of −90° to +90° shifts to a low frequency side when the height of the heat dissipation fin body is extended to 20 mm compared to a case in which the height of the heat dissipation fin body which can be regarded as the conventional mushroom-shaped EBG is as low as 3 mm, while when the thickness of the metal patch and the parasitic capacitance are increased, it is even lower. Therefore, the electrical characteristic can be adjusted by adjusting the shape of the metal patch.

In particular, in the case of a single pin-shaped heat dissipation fin 121, the EBG band is significantly lower than 3.7 GHz where 20 mm corresponds to ¼ of the wavelength, and by applying the heat dissipation fin including the metal patch at the tip of the heat dissipation fin body, the EBG band around 1 GHz can be used and the heat dissipation fin length can be reduced as necessary. Thus, it is possible to provide a small antenna apparatus.

Further, in the above example embodiments, the antenna apparatus including the antenna element 110 has been disclosed. However, the present disclosure may be applied to, for example, a radio apparatus that does not include an antenna element and that includes a heat generation source including a radiation part or a passive part of a radio wave, such as a reflector apparatus laid on a building for the purpose of improving a radio propagation environment regardless of whether it is spontaneous or passive radio wave radiation by reflection.

Figure 19:
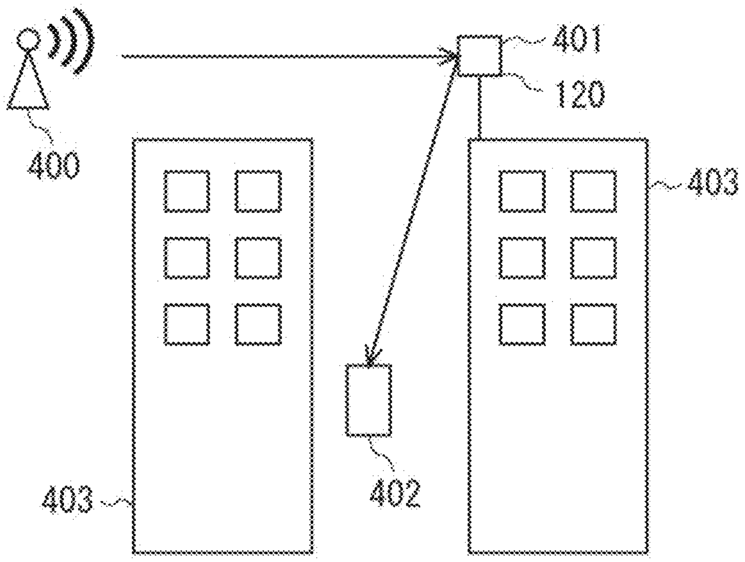
FIG. 19 is a schematic diagram showing the improvement of a radio wave propagation environment using a reflector apparatus according to an example embodiment of the present disclosure.

FIG. 19 shows a conceptual diagram of the placement of various types of radio apparatuses intended to improve the environment of radio wave propagation using a reflector apparatus 401, in which a radio wave from a base station 400 is reflected by the reflector apparatus 401 provided in a building 403 and transmitted to a terminal 402 of a user.

Note that, in the reflector apparatus 401, an apparatus having a function of controlling a reflection characteristic of a radio wave, for example, a function of controlling a characteristic of a reflected wave such as the reflection angle, such as a metasurface, may be applied. The heat dissipation part 120 according to this example embodiment can also be applied to the heat dissipation reflective surface of the reflector apparatus 401 like in the case of the antenna apparatus 100. According to this example embodiment, the heat dissipation part 120 disclosed in this example embodiment can also be applied to the reflector apparatus 401 having heat generated by an active element etc., and thus the size of the reflector apparatus can be reduced.

Figure 20:
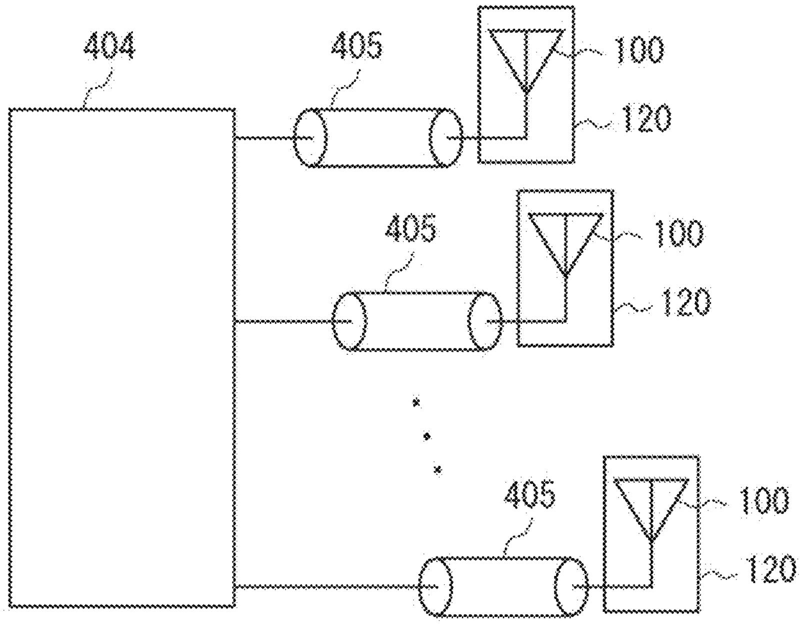
FIG. 20 is a schematic diagram of a distributed antenna system according to an example embodiment of the present disclosure.

As another example embodiment, the heat dissipation part 120 disclosed above may also be applied to a distributed antenna system (a radio system) or the like in which the antenna apparatuses 100 are arranged variously (e.g., discretely) as shown in FIG. 20 to improve the communication quality. Specifically, FIG. 20 is a schematic diagram of a configuration of a distributed antenna system in which high frequency signals are transmitted to and received from a control unit (a signal processing unit) 404 in a distributed manner, which includes a function of generating and modulating/demodulating high frequency signals, to each antenna apparatus 100 including the heat dissipation part 120 by a coaxial cable 405. According to this example embodiment, the heat dissipation part 120 can also be applied to the antenna apparatus 100, and the size of each of the antenna apparatuses 100 of the distributed antenna system can be reduced.

Note that the present disclosure is not limited to the above-described example embodiments and may be changed as appropriate without departing from the scope and spirit of the present disclosure.

The whole or part of the example embodiments disclosed above can be described as, but not limited to, the following supplementary notes.

Supplementary Note 1

A radio apparatus comprising a radiating element or a reflective element of a radio signal, and a heat dissipation part configured to dissipate heat generated by a heat generation source including the radiating element or the reflective element to the outside, wherein the heat dissipation part is composed of a solid material having a thermal conductivity and an electrical conductivity, and comprises a heat dissipation plate and a plurality of heat dissipation fins provided in the heat dissipation plate, the plurality of heat dissipation fins being disposed on a side of the heat dissipation plate where the radiating element or the reflective element is disposed, the heat dissipation fins form a periodic structure along at least one direction on the heat dissipation plate, and tips of the plurality of heat dissipation fins form a virtual reflective surface that reflects incident waves to the plurality of heat dissipation fins.

Supplementary Note 2

The radio apparatus according to supplementary note 1, wherein a distance between the heat dissipation fins is shorter than a height of the heat dissipation fin.

Supplementary Note 3

The radio apparatus according to supplementary note 1 or 2, wherein the virtual reflective surface prevents propagation of a radio wave of a predetermined frequency and functions as a magnetic wall of the predetermined frequency.

Supplementary Note 4

The radio apparatus according to any one of supplementary notes 1 to 3, wherein the virtual reflective surface is disposed at a position where a phase shift amount due to reflection is different from 180 degrees and a phase of a radiation wave from the radiating element or the reflective element and a phase of a reflected wave from the virtual reflective surface are in phase with each other on a radiation surface of the radiating element or the reflective element with regard to a radio wave of a predetermined frequency.

Supplementary Note 5

The radio apparatus according to any one of supplementary notes 1 to 4, wherein the heat dissipation fin has a rod-like shape.

Supplementary Note 6

The radio apparatus according to any one of supplementary notes 1 to 4, wherein the heat dissipation fin has a plate-like shape.

Supplementary Note 7

The radio apparatus according to any one of supplementary notes 1 to 6, wherein a length of the heat dissipation fin is $\lambda \times (N/2 + A \times 1/4)$ where $\lambda$ is a wavelength of a predetermined frequency, N is an integer greater than or equal to zero, and A is an arbitrary constant.

Supplementary Note 8

The radio apparatus according to any one of supplementary notes 1 to 4, wherein the heat dissipation fin comprises:

a rod-like heat dissipation fin body protruding from the heat dissipation plate; and a planar patch provided at a tip of the heat dissipation fin body, a length of the heat dissipation fin body is shorter than $\lambda \times (N/2 + 1/4)$, where $\lambda$ is a wavelength of a predetermined frequency and N is an integer greater than or equal to zero, and the virtual reflective surface is composed of a plurality of the patches.

Supplementary Note 9

The radio apparatus according to any one of supplementary notes 1 to 8, wherein a plurality of the reflective elements form a periodic array, the reflective elements form a part of the virtual reflective surface, and a reflection angle of a reflected wave on the virtual reflective surface is controlled by a structure and an array of the reflective elements periodically arrayed.

Supplementary Note 10

A radio system comprising:

the radio apparatus according to any one of supplementary notes 1 to 8; and a signal processing unit configured to process a radio signal transmitted and received by an antenna element, the antenna element being a radiating element of the radio apparatus.

Supplementary Note 11

The radio system according to supplementary note 10, comprising a plurality of the antenna elements, wherein the antenna elements are connected to the signal processing unit by a signal transmission cable and are discretely arranged.

Supplementary Note 12

A heat dissipation structure configured to dissipate heat generated by a heat generation source including a radiating element or a reflective element of a radio signal to the outside, wherein the heat dissipation structure is composed of a solid material having a thermal conductivity and an electrical conductivity, and comprises a heat dissipation plate and a plurality of heat dissipation fins provided in the heat dissipation plate, the plurality of heat dissipation fins being disposed on a side of the heat dissipation plate where the radiating element or the reflective element are disposed, the heat dissipation fins form a periodic structure along at least one direction on the heat dissipation plate, and tips of the plurality of heat dissipation fins form a virtual reflective surface that reflects incident waves to the plurality of heat dissipation fins.

Although the present disclosure has been described above with reference to example embodiments, the present disclosure is not limited to the above-described example embodiments. Various changes that can be understood by those skilled in the art can be made to the configuration and details of the present disclosure within the scope of the Disclosure.

This application is based upon and claims the benefit of priority from Japanese patent application No. 2021-143058, filed on Sep. 2, 2021, the disclosure of which is incorporated herein in its entirety by reference.

REFERENCE SIGNS LIST

100 ANTENNA APPARATUS
110 ANTENNA ELEMENT
111 ANTENNA FEEDER
112 ANTENNA RADIATION SURFACE
113*a*, 113*b* METAL PATTERN
120 HEAT DISSIPATION PART
121, 121*a*, 121*b* HEAT DISSIPATION FIN
122 HEAT DISSIPATION PLATE
123 HEAT DISSIPATION REFLECTIVE SURFACE
130 HEAT SOURCE
140 REAR SIDE HEAT DISSIPATION PART
141 REAR SIDE HEAT DISSIPATION FIN
142 REAR SIDE HEAT DISSIPATION PLATE
201 INCIDENT WAVE
202 REFLECTED WAVE
203 RADIATION WAVE
301 BOUNDARY WALL
400 BASE STATION
401 REFLECTOR APPARATUS
402 TERMINAL
403 BUILDING
404 CONTROL UNIT
405 COAXIAL CABLE

What is claimed is:

1. A radio apparatus comprising a radiating element or a reflective element of a radio signal, and a heat dissipation part configured to dissipate heat generated by a heat generation source including the radiating element or the reflective element to an outside, wherein the heat dissipation part is composed of a solid material having a thermal conductivity and an electrical conductivity, and comprises a heat dissipation plate and a plurality of heat dissipation fins provided in the heat dissipation plate, the plurality of heat dissipation fins being disposed on a side of the heat dissipation plate where the radiating element or the reflective element is disposed, the heat dissipation fins form a periodic structure along at least one direction on the heat dissipation plate, the heat dissipation fins having a rod-like shape or a plate-like shape, tips of the plurality of heat dissipation fins form a virtual reflective surface that reflects incident waves to the plurality of heat dissipation fins, a distance between the heat dissipation fins is shorter than a height of the heat dissipation fins, and the heat dissipation fins are arranged to surround the radiating element or the reflective element in order to provide an Electrical Band Gap (EBG) structure around a periphery of the radiating element or the reflective element.

2. The radio apparatus according to claim 1, wherein the virtual reflective surface prevents propagation of a radio wave of a predetermined frequency and functions as a magnetic wall of the predetermined frequency.

3. The radio apparatus according to claim 1, wherein the virtual reflective surface is disposed at a position where a phase shift amount due to reflection is different from 180 degrees and a phase of a radiation wave from the radiating element or the reflective element and a phase of a reflected wave from the virtual reflective surface are in phase with each other on a radiation surface of the radiating element or the reflective element with regard to a radio wave of a predetermined frequency.

4. The radio apparatus according to claim 1, wherein a length of the heat dissipation fin is $\lambda \times (N/2 + A \times 1/4)$, where $\lambda$ is a wavelength of a predetermined frequency, N is an integer greater than or equal to zero, and A is an arbitrary constant greater than 0.

5. The radio apparatus according to claim 1, wherein a plurality of reflective elements form a periodic array, the plurality of reflective elements form a part of the virtual reflective surface, and a reflection angle of a reflected wave on the virtual reflective surface is controlled by a structure and an array of the plurality of reflective elements periodically arrayed.

6. A radio system comprising:

the radio apparatus according to claim 1; and signal processing means for processing a radio signal transmitted and received by an antenna element, the antenna element being the radiating element of the radio apparatus.

7. The radio system according to claim 6, comprising a plurality of the antenna elements, wherein the plurality of antenna elements are connected to the signal processing means by a signal transmission cable and are discretely arranged.

8. A heat dissipation structure configured to dissipate heat generated by a heat generation source including a radiating element or a reflective element of a radio signal to an outside, wherein the heat dissipation structure is composed of a solid material having a thermal conductivity and an electrical conductivity, and comprises a heat dissipation plate and a plurality of heat dissipation fins provided in the heat dissipation plate, the plurality of heat dissipation fins being disposed on a side of the heat dissipation plate where the radiating element or the reflective element are disposed, the heat dissipation fins form a periodic structure along at least one direction on the heat dissipation plate, the heat dissipation fins having a rod-like shape or a plate-like shape, and tips of the plurality of heat dissipation fins form a virtual reflective surface that reflects incident waves to the plurality of heat dissipation fins, a distance between the heat dissipation fins is shorter than a height of the heat dissipation fins, and the heat dissipation fins are arranged to surround the radiating element or the reflective element in order to provide an Electrical Band Gap (EBG) structure around a periphery of the radiating element or the reflective element.

9. A radio apparatus comprising a heat dissipation structure configured to dissipate heat generated by a heat generation source including a radiating element or a reflective element of a radio signal to an outside, wherein the heat dissipation structure is composed of a solid material having a thermal conductivity and an electrical conductivity, and comprises a heat dissipation plate and a plurality of heat dissipation fins provided in the heat dissipation plate, the plurality of heat dissipation fins being disposed on a side of the heat dissipation plate where the radiating element or the reflective element are disposed, the heat dissipation fins form a periodic structure along at least one direction on the heat dissipation plate, and tips of the plurality of heat dissipation fins form a virtual reflective surface that reflects incident waves to the plurality of heat dissipation fins, wherein the heat dissipation fin comprises:

a rod-like heat dissipation fin body protruding from the heat dissipation plate; and a planar patch provided at a tip of the heat dissipation fin body, a length of the heat dissipation fin body is shorter than $\lambda \times (N/2+1/4)$, where $\lambda$ is a wavelength of a predetermined frequency and N is an integer greater than or equal to zero, and the virtual reflective surface is composed of a plurality of patches.

* * * * *